United States Patent [19]

Barnum et al.

[11] Patent Number: 5,331,619
[45] Date of Patent: Jul. 19, 1994

[54] PROGRAMMABLE CONTROL SYSTEM FOR GAS AND LIQUID DISPENSING DEVICES

[75] Inventors: Thomas G. Barnum, Fox Point; Lane B. Anderson, West Allis; Richard S. Missimer, Sussex, all of Wis.

[73] Assignee: Bradley Corporation, Menomonee Falls, Wis.

[21] Appl. No.: 838,062

[22] Filed: Feb. 19, 1992

[51] Int. Cl.⁵ .............................................. G06F 15/46
[52] U.S. Cl. .................................. 364/132; 137/624.11; 4/DIG. 15; 364/420; 364/510
[58] Field of Search ............... 364/420, 510, 132, 180, 364/160, 138, 131, 505, 506; 239/69, 70, 68, 71–73; 137/624.11–624.20; 4/191, 192, DIG. 4, DIG. 15

[56] References Cited

U.S. PATENT DOCUMENTS

| | | |
|---|---|---|
| 4,108,419 | 8/1978 | Sturman et al. . |
| 4,176,395 | 11/1979 | Evelyn-Veere et al. . |
| 4,244,022 | 1/1981 | Kendall ................ 364/420 |
| 4,352,376 | 10/1982 | Norwood . |
| 4,563,780 | 1/1986 | Pollack ................ 364/510 |
| 4,569,020 | 2/1986 | Snoddy et al. ........... 364/420 |
| 4,722,478 | 2/1988 | Fletcher et al. .......... 364/420 |
| 4,756,030 | 7/1988 | Juliver . |
| 4,797,820 | 1/1989 | Wilson et al. ........... 364/420 |
| 4,799,142 | 1/1989 | Waltzer et al. . |
| 4,807,664 | 2/1989 | Wilson et al. . |
| 4,869,427 | 9/1989 | Kawamoto et al. . |
| 4,914,758 | 4/1990 | Shaw . |
| 4,971,287 | 11/1990 | Shaw . |
| 4,985,944 | 1/1991 | Shaw . |
| 5,021,939 | 6/1991 | Pulgiese ................ 364/420 |
| 5,025,361 | 6/1991 | Pitman et al. . |
| 5,031,258 | 7/1991 | Shaw . |
| 5,038,268 | 8/1991 | Krause et al. ........... 364/420 |
| 5,060,167 | 10/1991 | Ticcioni et al. .......... 364/132 |
| 5,060,323 | 10/1991 | Shaw . |

OTHER PUBLICATIONS

New Micro-Touch II ™ brochure, Bradley Corporation, Dec. 31, 1991.
"Showers With Micro-Touch ™ Control", Bradley Corporation, 1988, pp. 1/9–1/14.

Primary Examiner—Jerry Smith
Assistant Examiner—Steven R. Garland
Attorney, Agent, or Firm—Andrus, Sceales, Starke & Sawall

[57] ABSTRACT

A programmable fluid or gas control system controls the operation of one or more solenoid valves, each of which in turn controls a gas or fluid dispensing unit. The control system may be used to control water dispensing fixtures such as sprinklers, sinks, showers, toilets and the like, or it may be used in heating-ventilating-air conditioning (HVAC) applications. The control system may have several configurations. In one configuration, a master controller controls one or more slave circuits, which in turn control one or more solenoid valves. Each valve controls at least one gas or liquid dispensing device. The mode of operation of any particular valve and the timing of its operation may be input either via the master controller or via the associated slave control circuit. The operation of the valve may be easily changed without changing hardware or software, allowing the system to be used in a wide variety of applications. In other configurations, the master controller is not used. Either a single slave control circuit may be used to operate one or more valves, or multiple slave controllers, each controlling at least one valve, may be linked together via a communications data bus to transfer information between them.

47 Claims, 19 Drawing Sheets

STATUS/CONTROL PANEL MODE CHANGE ENTRY

| FIRST KEY | SECOND KEY | THIRD KEY | ACTION |
|---|---|---|---|
| 0 | 1 | ENable | water on to slave 1 |
| 0 | 1 | DISable | water off to slave 1 |
| 1 | 7 | ENable | water on to slave 17 |
| 1 | 7 | DISable | water off to slave 17 |
| CD (code) | 1 | ENable | water on to slaves in Group 1 |
| CD | 1 | DISable | water off to slaves in Group 1 |
| CD | 2 | ENable | water on to slaves in Group 2 |
| CD | 2 | DISable | water off to slaves in Group 2 |
| CD | 5 | ENable | water on to all slaves |
| CD | 5 | DISable | water off to all slaves |

FIG. 5a

STATUS/CONTROL PANEL VALVE TIME DATA ENTRY

| FIRST KEY | SECOND KEY | THIRD KEY | ACTION |
| --- | --- | --- | --- |
| P | 1 (LCV/shower) | P (hold down) | Programs valve ON time for no. of seconds that third key is held down. |
| P | 2 (black out) | P (hold down) | Programs valve OFF time for no. of seconds that third key is held down. |
| P | 3 (combs) | P | Programs two valves to only operate simultaneously. |

FIG. 5b

STATUS/CONTROL PANEL VALVE TIME DATA TRANSMISSION

| FIRST KEY | SECOND KEY | THIRD KEY | ACTION |
|-----------|------------|-----------|--------|
| 0 | 1 | * | Sends valve time data to slave 1 |
| 1 | 7 | * | Sends valve time data to slave 17 |
| CD (code) | 1 | * | Sends valve time data to all slaves in Group 1 |
| CD (code) | 5 | * | Sends valve time data to all slaves |

FIG. 5c

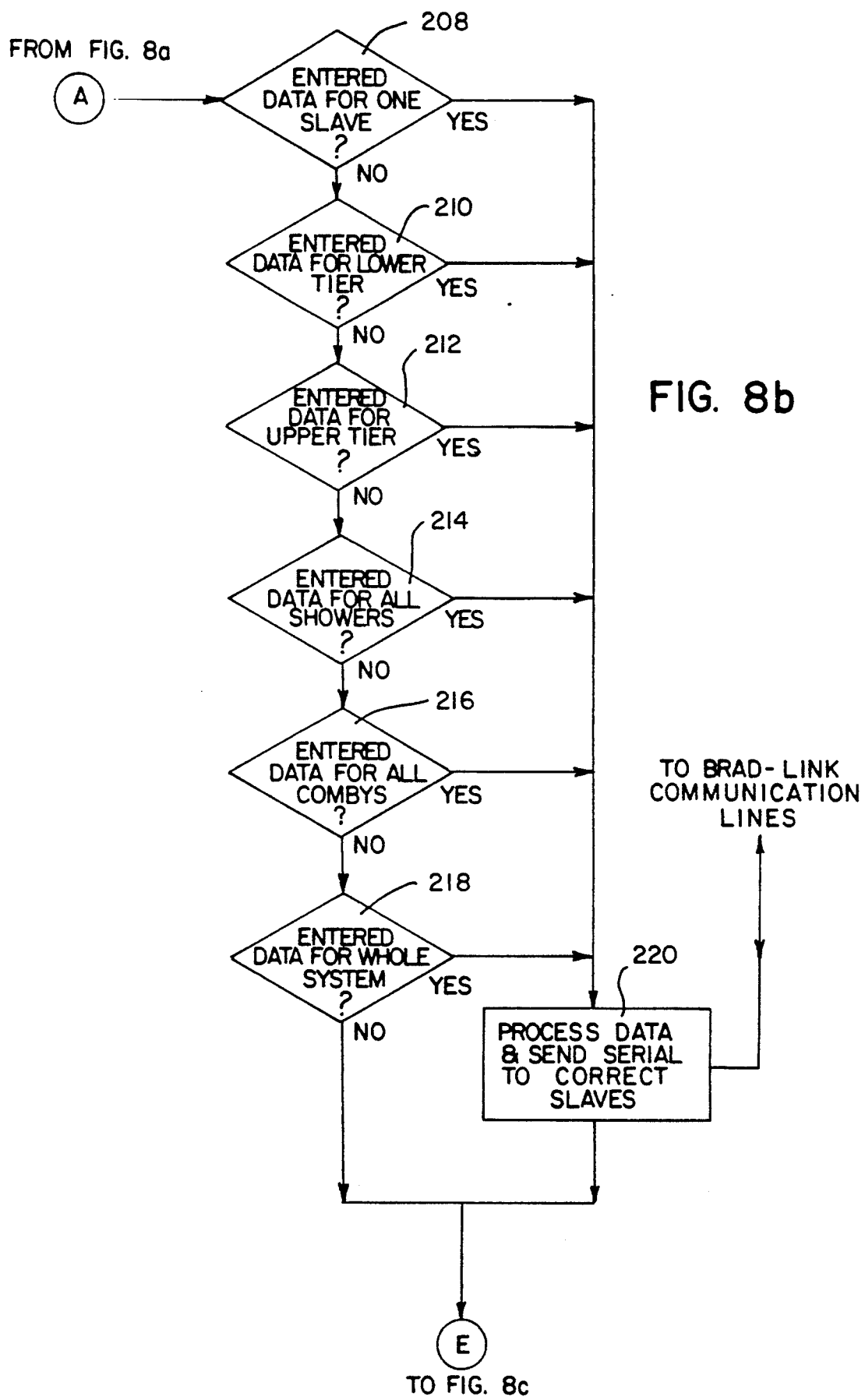

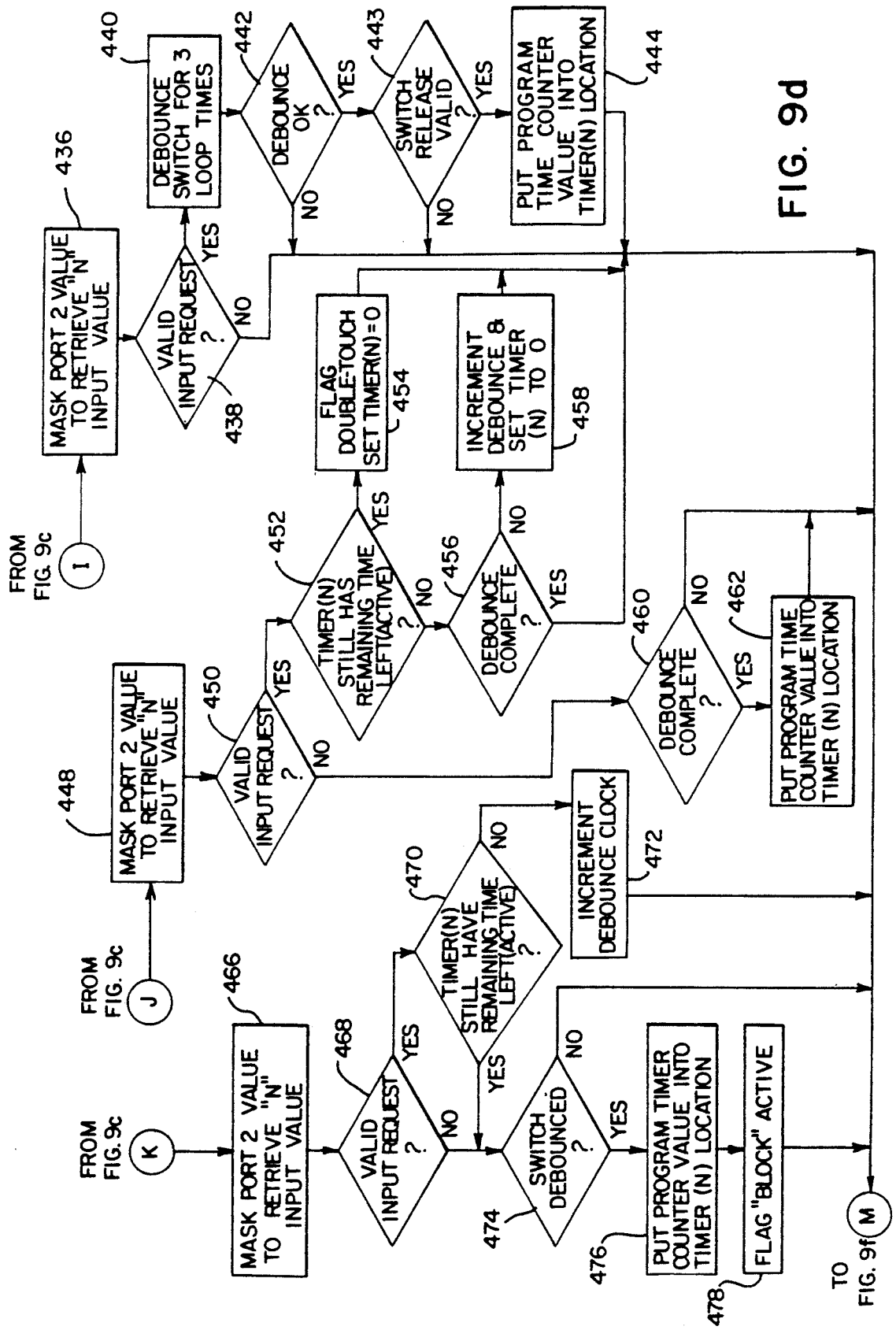

PROGRAMMABLE CONTROL SYSTEM FOR GAS AND LIQUID DISPENSING DEVICES

BACKGROUND OF THE INVENTION

This invention relates to programmable control systems that control gas or liquid dispensing devices. More particularly, the present invention relates to programmable heating, ventilating and air conditioning control (HVAC) systems, and to programmable water control systems for controlling the operation of a plurality of plumbing fixtures, such as showers, sinks, toilets, sprinklers and the like.

Control systems are known that control a plurality of gas dispensing devices such as heaters, ventilators, and air conditioners in an HVAC system. Water control systems are also known that control a plurality of water dispensing devices, such as sprinklers, sinks, showers, toilets and the like. A typical water control system has a controller that controls the operation of one or more solenoid valves. In general, each valve controls the water flow to at least one water dispensing device. The time at which one or more valves is to be turned ON, the length of the ON time of a particular fixture or group of fixtures, any designated OFF times for the fixtures, and the number of operations of a fixture during a predetermined time period may be either preprogrammed or input via an input device such as a keypad. The controller receives the input information and controls the operation of the associated valves to implement the instructions.

Although the duration of fixture operation may be readily changed, the manner or mode in which the fixture operates typically cannot be changed in prior art control systems. That is, the mode or "personality" of the fixture and its operation is predetermined because the fixture's controller is typically a dedicated processor. The only way to change the fixture's mode of operation—other than the duration and timing of its operation—is to replace the controller altogether.

For example, assume that a controller controls several water dispensing devices of a first type, such as a group of showers. Although the duration of shower operation, the number of operations per unit time, and any periods when the showers are prevented from operating (called "block-out" times) may be changed, the controller is a dedicated shower controller. It cannot also be used to control toilets, faucets, or other types of water dispensing units since these units have much different timing requirements. For example, a shower may be set to operate both hot and cold water valves for five minutes each, but a toilet only uses cold water and only flushes for a few seconds. Thus, a separate dedicated controller having different programmed instructions and different circuitry would be needed to control the toilet. Similarly, a different type of controller would be needed to control the faucet operation as well.

This requirement for several different types of controllers and programming instructions results in a water control system which is very expensive where more than one type of water dispensing unit is being controlled. In a prison system, for example, distinct controllers and/or software programs must be used to control the toilets, the sinks, and the showers for each group of cells. Also, the controller for the toilets cannot be used to control the showers.

A related disadvantage of prior art systems is that once the mode of a particular water dispensing fixture has been preset, it cannot be changed without replacing the controller or rewriting the software. For example, one mode of operating a shower is a "meter-only" mode. When the user presses a button, the metering or ON cycle begins. The cycle runs its full course for the preset time even if the button is pushed again. Once the showers have been installed in a meter-only mode, the mode cannot be changed. However, the proprietor of the facility may later wish to change the shower mode to a "double-touch" mode in which one touch of the button starts the cycle, and a second touch of the button ends the cycle even if the cycle is not completed. In a typical prior art water control system, this mode could only be changed by replacing the entire controller or by re-writing the software which operates the controller.

Since prior art water control systems have only a single controller, the mode of all the showers would have to be changed. That is, there is no provision for changing the mode of only a single group of showers without changing the mode for all of the showers. Even if the mode is to be changed, the water and/or the power must typically be shut off to the system to make the change, resulting in down time.

Since the prior art control systems have hardware or software which is not readily changed, the system cannot be used in different types of applications without redesigning the circuitry or rewriting the software. For example, a water control system for a prison cannot be readily adapted to control the restrooms in an office building. This limitation of prior art systems increases the cost of the systems since additional engineering time is needed to redesign the system for different applications.

SUMMARY OF THE INVENTION

A programmable control system is disclosed for controlling the operation of a plurality of valves, or of a plurality of groups of valves, each valve controlling the output of at least one gas or liquid dispensing fixture. The control system includes an input device that accepts valve mode data and valve time data for each valve, a controller that processes the valve mode data and the valve time data and that generates an output signal to control the valve in response thereto, and a change circuit that receives changed valve mode data and changed valve time data, and that transmits the changed data to the controller. The valve data or the changed valve data may be input by a variety of input devices, including dual-inline-package (DIP) switches, a keypad, a pushbutton switch, or an optical sensor that senses infrared or ultraviolet radiation. The control system also includes a processor that periodically interrogates the input device to determine whether the valve mode data or the valve time data has been changed.

In an alternate embodiment, the control system includes at least two slave control circuits, each of which controls at least one valve. Each slave circuit includes an input device that accepts valve mode data and valve time data for its associated valve, a controller that processes the valve mode data and the valve time data and that generates an output signal to operate the valve, and a change circuit that receives changed valve mode data and changed valve time data and that transmits the changed data to the controller.

The control system according to the present invention may also include a master controller which in turn controls one or more slave control circuits. The master controller includes an input device that accepts valve mode data and valve time data, and that transmits the valve mode and valve time data to the slave circuits which have been programmed to receive the data. In this configuration, valve mode data and valve time data for a particular valve or group of valves may be input via the master controller, or via the slave control circuit which controls that particular valve or group of valves.

It is a feature and advantage of the present invention to provide a gas or liquid control system which may be used in a wide variety of applications without changing the hardware or the software.

It is yet another feature and advantage of the present invention to provide a control system in which the mode of operation of any gas or liquid dispensing fixture may be readily changed without reprogramming and without replacing any hardware.

It is yet another feature and advantage of the present invention to provide a control system in which the mode of operation of some-but not all-valves may be readily changed without reprogramming and without changing any hardware.

It is yet another feature and advantage of the present invention to provide a control system in which the mode of operation may be changed without shutting off either the power or the supply of the gas or liquid that is being dispensed.

It is yet another feature and advantage of the present invention to provide a control system in which the mode of operation or the timing of operation may be readily changed at either a master controller or at one or more slave control circuits.

These and other features and advantages of the present invention will be apparent to those skilled in the art from the following detailed description of preferred embodiments and the attached drawings, in which:

BRIEF DESCRIPTION OF THE DRAWINGS

FIGS. 5a through 5c are charts depicting the manner in which data may be entered and transmitted via the status panel depicted in FIG. 2.

FIG. 5a lists typical examples of the keys which are depressed on the keypad in FIG. 2 to enter valve mode data or changed valve mode data.

FIG. 5b lists typical examples of the keys which are depressed on the keypad of FIG. 2 to enter valve time data or changed valve time data.

FIG. 5c lists typical examples of the keys which are depressed on the keypad of FIG. 2 to cause valve time data to be transmitted to individual slave control circuits.

FIGS. 8a through 8c together comprise a flowchart for the software that operates the master controller depicted in FIG. 3.

FIGS. 9a through 9g together comprise a flowchart for the software that operates the slave control circuit depicted in FIG. 6.

Detailed Description of Preferred Embodiments

SYSTEM WIRING DIAGRAM

Figure 1:
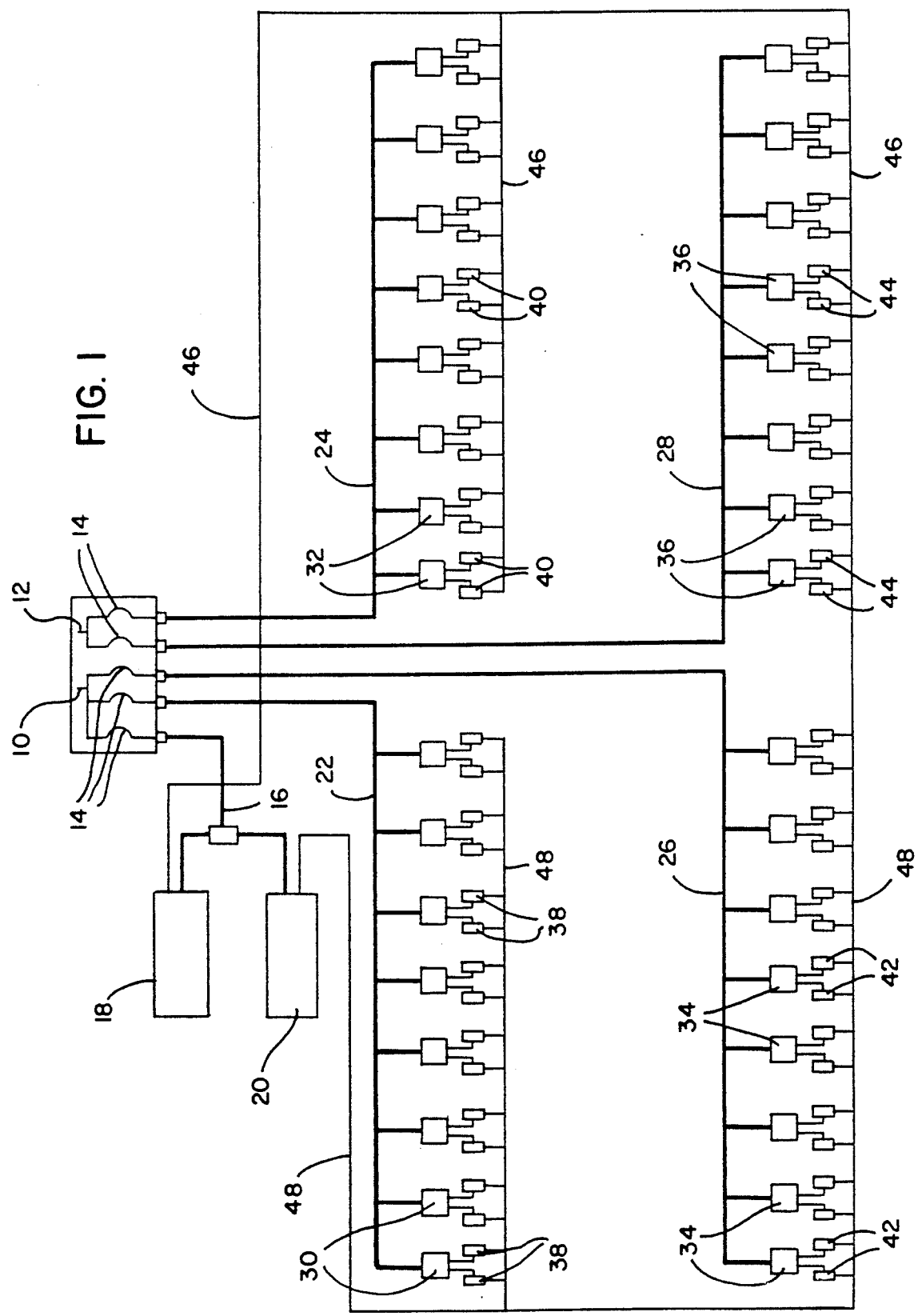
FIG. 1 is a wiring diagram for a prison water control system according to the present invention having two master controllers and a plurality of slave control circuits.

FIG. 1 is a wiring diagram for a water control system according to the present invention having two master controllers, each of which controls thirty-two slave control circuits. In FIG. 1, 120 VAC line current is connected to the water control system via AC lines 10 and 12. The line current passes through a series of 20 amp breakers 14 and is transmitted via line 16 to the internal 120 V to 12 VAC transformer of master controllers 18 and 20. The line current is also transmitted via lines 22, 24, 26, and 28 to transformers 30, 32, 34, and 36 respectively. Each of the transformers 30 through 36 provides 24 VAC to power the slave circuits connected thereto. Each of transformers 30 powers two slave circuits 38. Likewise, each of transformers 32 powers two slave circuits 40, each of transformers 34 powers two slave circuits 42, and each of transformers 36 powers two slave circuits 44.

Each of the slave circuits 38 through 44 in turn controls at least one solenoid valve. Each of the solenoid valves controls the water supply to all the water dispensing devices in a single prison cell, including a sink, a faucet, a shower, and/or a toilet. As shown in FIG. 1, the slave circuits are grouped in pairs to reduce the number of transformers that are required in the system.

Figure 2:
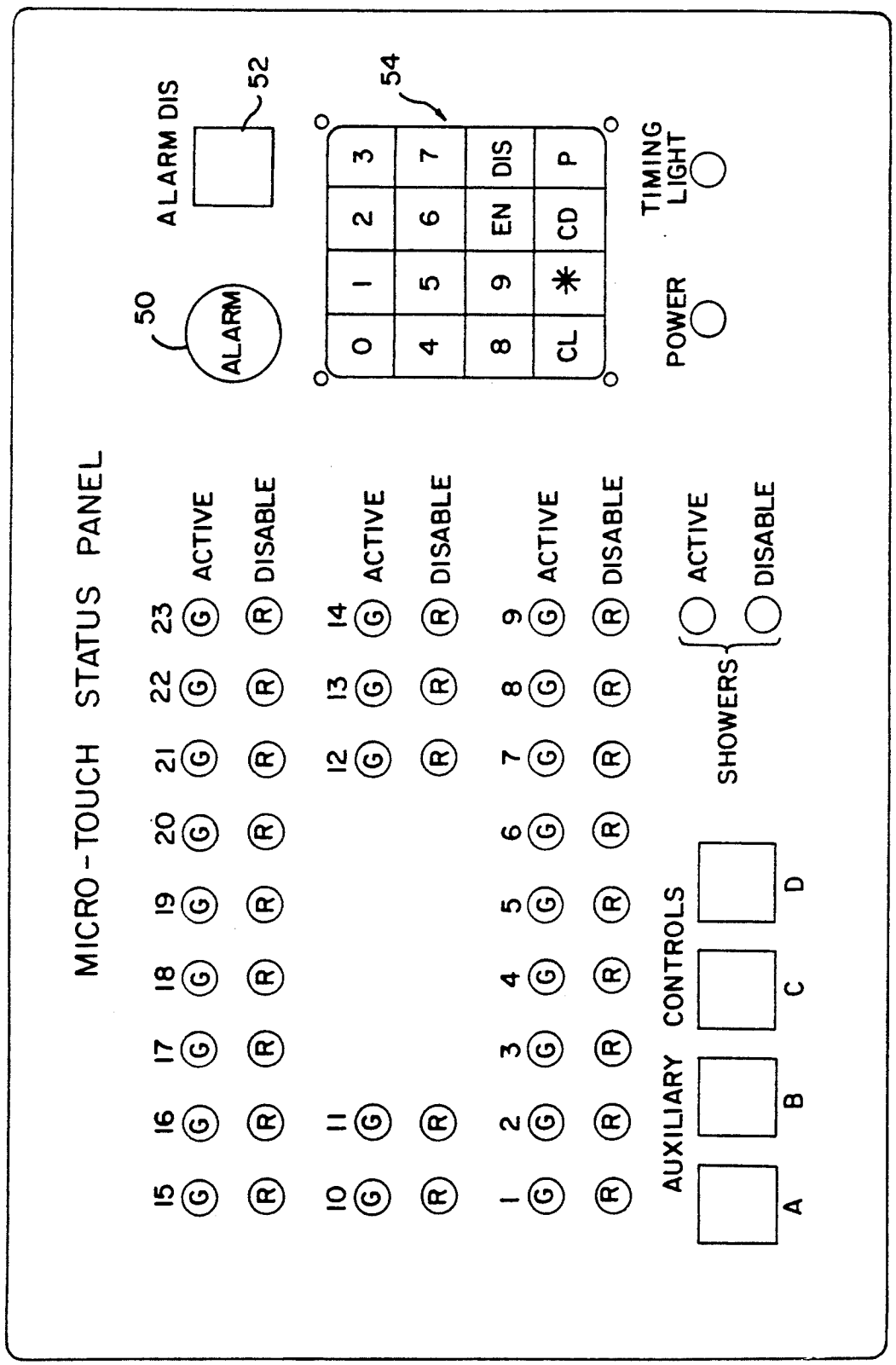
FIG. 2 depicts a status panel of one of the master controllers of FIG. 1 depicting the status of the slave circuits in a prison water control system.

Master controller 18 is connected via data bus 46 to each of slaves 40 and 44. Similarly, master controller 20 is connected to each of slaves 38 and 42 via a data bus 48. Buses 46 and 48 each preferably comprises a twisted pair of wires. Buses 46 and 48 permit their respective master controllers 18 and 20 to transmit valve mode data and valve timing data to their respective slaves, and also permit the master controllers to interrogate the slaves to determine their status at any given moment. The status of the slaves is indicated on the master status panel, as depicted in FIG. 2. One master status panel is used with each master controller.

MASTER STATUS PANEL

Referring to FIG. 2, the status of any slave may be easily determined by the visual indicators which correspond to each slave control circuit. The status panel in FIG. 2 depicts only twenty-three slave control circuits, since some of the slaves depicted in FIG. 1 were not used in this particular prison application. Each prison cell has its own slave control circuit.

As shown in FIG. 2, each of the numbered slave circuits has a green light emitting diode (LED) marked "G", and a red LED labeled "R". A green light being ON indicates that its associated slave circuit is active or working. A red light being ON indicates that its associated slave has been disabled. A blinking red light indicates that there is an error somewhere in the system and alarm 50 will sound unless the alarm has been disabled by pressing alarm disable button 52. A blinking red light may be caused by a power failure at the associated slave circuit, a broken bus wire, a defective slave circuit, or by another malfunction. A flashing green light indicates that water is being used at the associated slave/prison cell location.

The status panel depicted in FIG. 2 also includes a keypad 54 by which the status of any particular slave may be changed, by which the valve mode may be entered or changed by providing a change signal to its associated slave circuit, or by which the valve operating ON time or OFF time may be programmed or changed. Keypad 54 includes an enable key EN, a disable key DIS, a clear key CL, a transmit key *, a code key CD, and a program key P. The functions of these keys will be described below in connection with FIGS. 5a through 5c.

The status panel also includes auxiliary control keys A, B, C, and D. Since the particular prison installation being described has four dormitories A through D, each of the auxiliary controls corresponds to a particular dormitory. Pressing one of the auxiliary control keys actuates a solenoid that feeds water to the entire dormitory, so that all the water to the entire dormitory could be immediately shut off and thereafter turned on.

The status panel also includes LED indicators which show whether the showers are active or disabled.

FIG. 5a lists typical key sequences by which the mode of a particular slave circuit and thus its associated valves may be entered or changed. Each entry of instructions requires that three keys be pressed in the proper sequence, labeled the First Key, the Second Key, and the Third Key. Referring to FIG. 5a, if the 0 key on keypad 54 is pressed first, followed by the 1 key and then the enable EN key, a signal is transmitted to the slave circuit identified as slave 1 that allows the slave to control its associated valves in accordance with its programmed instructions. If the First Key pressed is the 0 key, the Second Key pressed is a 1 and the Third Key pressed is the disable DIS key, slave 1 is instructed to keep the water OFF to all of its associated valves. Such a command may be sent, for example, in a prison shakedown to prohibit the prisoners from disposing of contraband in a toilet or a sink.

As shown in FIG. 5a, the slaves may be grouped so that several slaves may be controlled by the same input command. For example, pressing the code CD key, then the 1 key, and then the enable EN key allows all the slaves in a Group 1 to operate normally. However, pressing the code CD key, the 1 key, and then the disable DIS key prohibits all the slaves in Group 1 from turning ON their associated valves. All the slaves may be allowed to operate normally by pressing the code CD key, the 5 key, and then the enable EN key. Similarly, all the slaves may be disabled by pressing the code CD key, the 5 key, and then the disable DIS key. Of course, other alternate instructions or sequences may be used in place of those listed in FIG. 5a.

FIG. 5b is a chart depicting typical keying sequences which may be used to input valve timing data via the master status panel. Referring to FIG. 5b, if the program P key is first pressed, the 1 key is then pressed, and the program P key is then held down, the valve ON time for the designated slave is programmed for the number of seconds that the Third Key P is held down. If the First Key pressed is the program P key, the Second Key is the 2 key, and the program P key is then held down, the OFF time (block-out time) after a valve's ON time is programmed for the number of seconds that the Third Key is held down. If the program key P is first pressed, the 3 key is then pressed, and the program key P is then pressed, two designated valves are programmed to operate in the "Comby" mode so that they only operate simultaneously. The Comby mode may be used, for example, to control two toilets so that both may be prevented from flushing during a check for contraband.

FIG. 5c is a chart depicting the keying sequences to transmit the valve time data input via the status panel from the master controller to the designated slave control circuit. Referring to FIG. 5c, if the First Key pressed is the 0 key, the Second Key pressed is the 1 key, and the Third Key pressed is the * key, the valve timing data will be sent to slave 1. If the First Key pressed is the code CD key, the Second Key is the 1 key, and the Third Key is the * key, the valve timing data will be sent to all the slaves which have been grouped into Group 1. If the First Key pressed is the code CD key, the Second Key is the 5 key, and Third Key is the * key, the valve timing data will be sent to all of the slave control circuits.

MASTER CONTROLLER CIRCUIT

Figure 3:
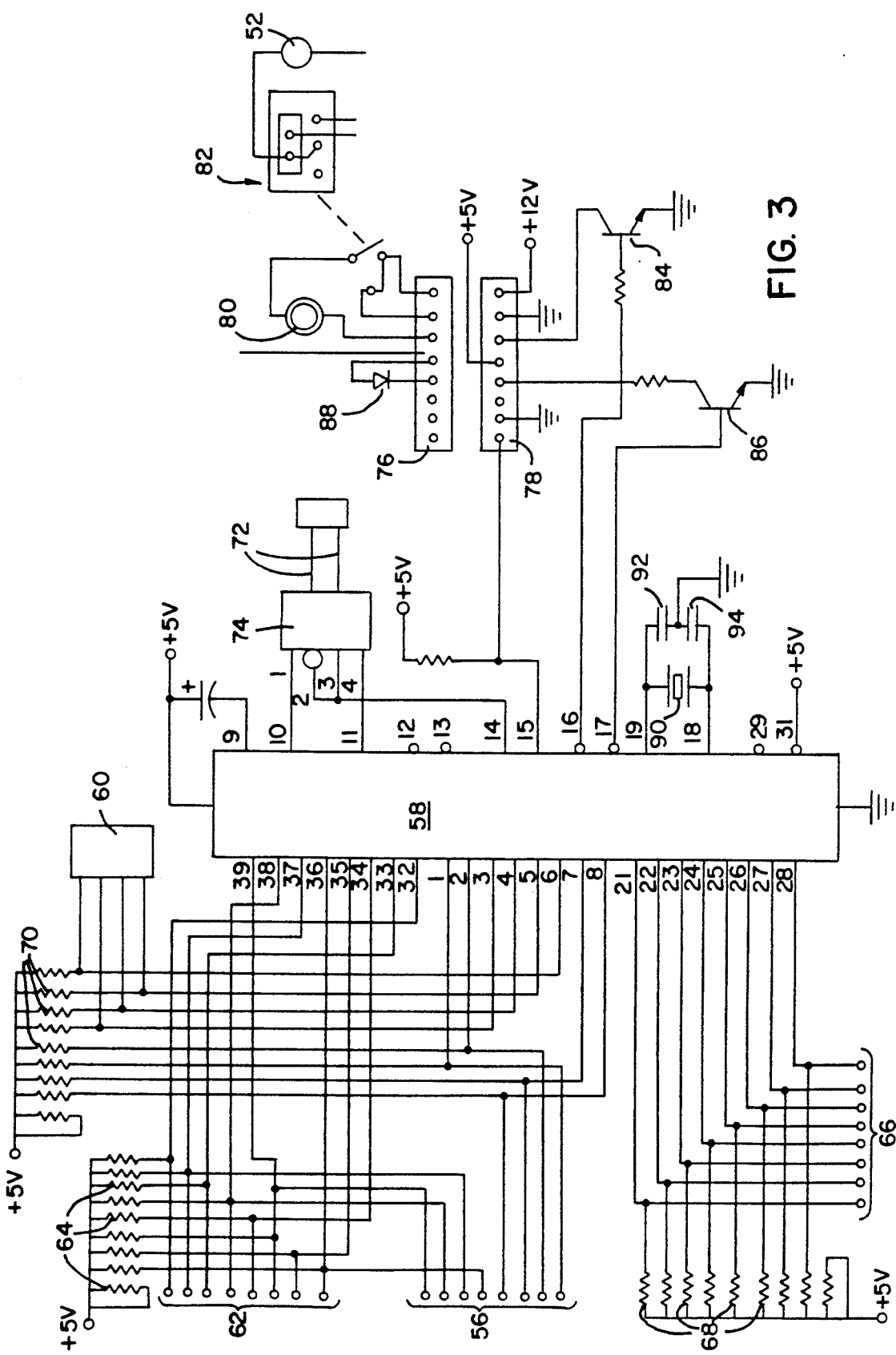
FIG. 3 is a schematic diagram of the master controller depicted in FIG. 1.
Figure 4:
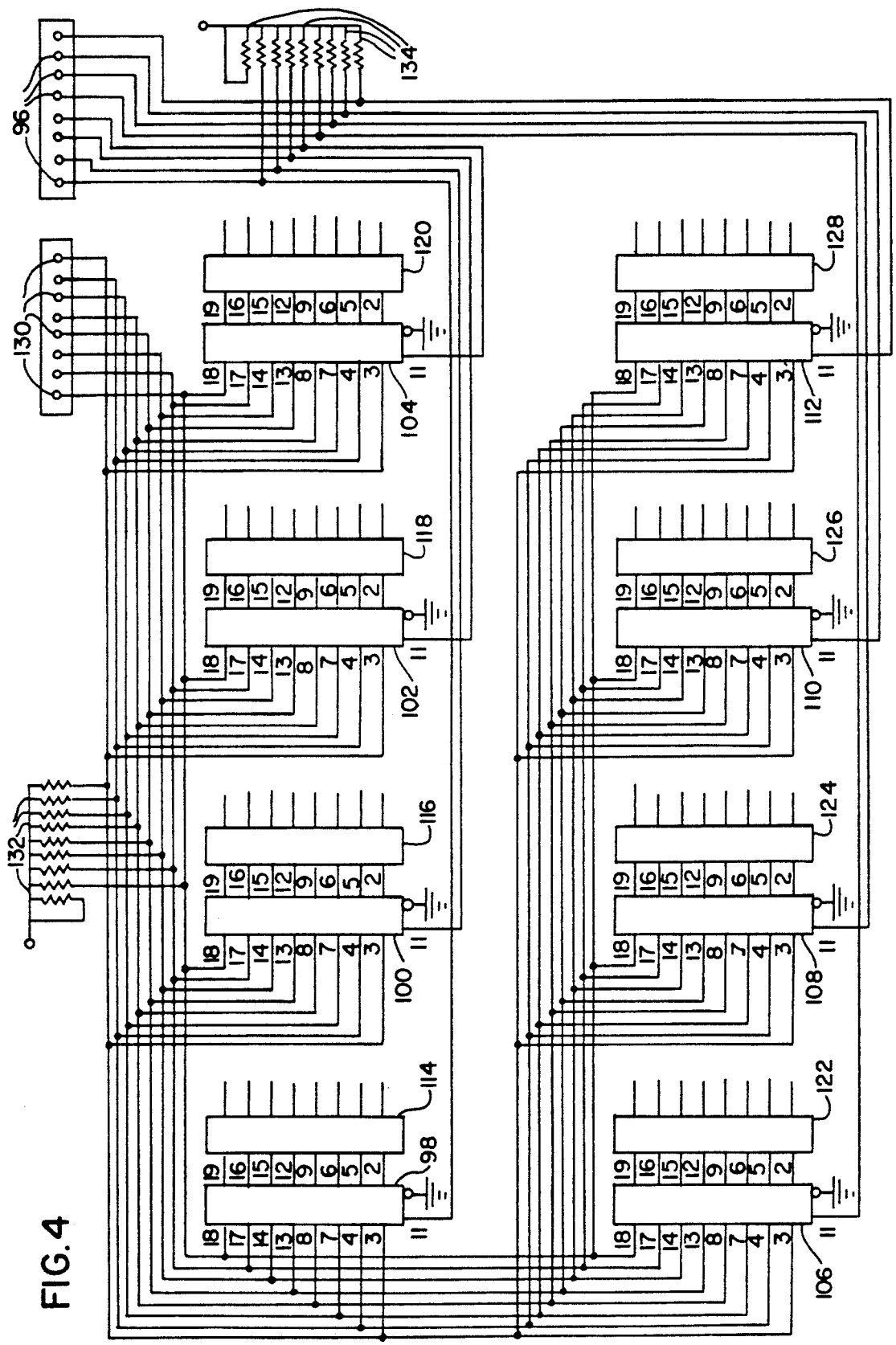
FIG. 4 is a schematic diagram of the driver circuit for the status panel depicted in FIG. 2.

FIGS. 3 and 4 together comprise the master controller and the status panel circuitry. In FIG. 3, lines 56 together comprise a keypad data bus that is used to input data from keypad 54 (FIG. 2) to either pins 1 or 2 of processor 58. Processor 58 is preferably a Part No. 87C51BH microprocessor made by Signetics Corp. of California, although other processors may be used. Keypad 54 is a matrix, scanning type of keypad. Processor 58 outputs a low state signal sequentially on one of the four rows of the keypad, and then looks at the input from the keypad columns to determine whether a key has been pressed.

Valve mode data, valve timing data, and other information input via keypad 54 is also stored in a digital, non-volatile memory device 60. Memory 60 is preferably a Part No. 75176 integrated circuit made by National Semiconductor of California.

Once processor 58 determines which keys have been pressed, the information is processed by processor 58 and its associated software (FIGS. 8a through 8c), and the appropriate commands are output by processor 58 via pins 32 through 39 to driver data bus 62. The signals on the driver data bus drive latches 98 through 112 depicted in the schematic in FIG. 4 to determine which of the status panel lights are to be turned ON or OFF. Resistors 64 are pull-up resistors for pins 32 through 39.

Pins 21 through 28 of processor 58 transmit driver chip enable signals to latches 98 through 112 (FIG. 4) via lines 66. The driver chip enable signals enable the latches depicted in FIG. 4 to receive the driver data signals present on driver data bus 62. Resistors 68 are pull-up resistors for pins 21 through 28 of processor 58. Similarly, resistors 70 are pull-up resistors for pins 1 through 8 of processor 58.

Pins 10 and 11 of processor 58 are used to transmit control signals to the slave circuits via a communication bus consisting of lines 72. The control signals are transmitted through a circuit 74 which accepts data from bus 72 or which transfers data to bus 72. Circuit 74 is preferably a Part No. 95176 integrated circuit made by National Semiconductor of California.

Pin 14 is connected to circuit 74 and acts as a toggle switch to tell processor 58 in which direction information is being transmitted via bus 72. Pin 15 is an input connected as a flag which tells processor 58 whether plug 76 is connected to receptacle 78. If plug 76 is not connected to receptacle 78, piezoelectric alarm 80 is not functioning, and processor 58 does not attempt to send an alarm signal to alarm 80. Switch circuit 82, which is responsive to alarm disable switch 52 (FIG. 2), disables alarm 80 if the disable switch has been pressed.

Pin 16 of processor 58 is connected to a transistor switch 84 which drives alarm 80. Whenever there is an error in the system, a high state signal is present at pin 16 which turns ON transistor 84. The turning ON of transistor 84 will sound alarm 80.

While valve timing data is being entered to the system, the signal placed on pin 17 alternates from a logic high to a logic low once per second, thereby turning ON transistor 86 once per second. The turning ON of transistor 86 causes LED 88 to blink, thereby telling the operator that valve timing data is being entered.

The clock signal for processor 58 is derived from a crystal oscillator 90, which is caused to oscillate by the placing of alternating high state signals on pins 18 and 19 which then charge capacitors 92 and 94, as is well known in the art. Oscillator 90 oscillates at a frequency of 11.0592 MHz.

Pin 31 of processor 58 is used to flag processor 58 that the internal memory of the processor is being used and not an external random access memory (RAM). However, the instructions input via the master status panel, the valve mode data and the valve timing data are also stored in a non-volatile memory device 60 in the event of a power failure.

Power to the circuit depicted in FIG. 3 as well as to the status panel driver circuit (FIG. 4) is provided by a five volt DC power supply that includes a full-wave bridge rectifier which rectifies the 120 VAC line current, as is well known in the art.

STATUS PANEL DRIVER CIRCUIT

FIG. 4 is a schematic of the status panel driver circuit which controls the green and red LEDs on the status panel of FIG. 2 in accordance with instructions from processor 58 of FIG. 3. In FIG. 4, the driver chip enable signals on bus 66 of FIG. 3 are input to lines 96 of FIG. 4. Each of lines 96 is connected to pin 11 of one of latches 98 through 112. Latches 98 through 104 control the green lights, and latches 106 through 112 control the red lights on the status panel. Each of the latches controls up to eight lights. Each of latches 98 through 112 has connected thereto a pull-up resistor array 114 through 128, respectively. Arrays 114 through 128 are preferably single-inline-package (SIP) resistors made by CTS of Indiana. Each of the latches is preferably a Part No. HC373 latch manufactured by Motorola of Phoenix, Ariz.

Driver data on bus 62 of FIG. 3 is input to lines 130 of FIG. 4. Each line 130 is connected to an input to each of latches 98 through 112. Resistors 132 are pull-up resistors for the latch inputs. Resistors 134 are pull-up resistors for the enable pins of the latches, pin 11.

In operation, microprocessor 58 sequentially places chip enable signals on lines 96, while placing data signals on lines 130. If one of latches 98–112 is enabled while data is on a particular line 130, then the LED associated with that line will be turned ON.

MASTER CONTROLLER SOFTWARE

Figure 8A:
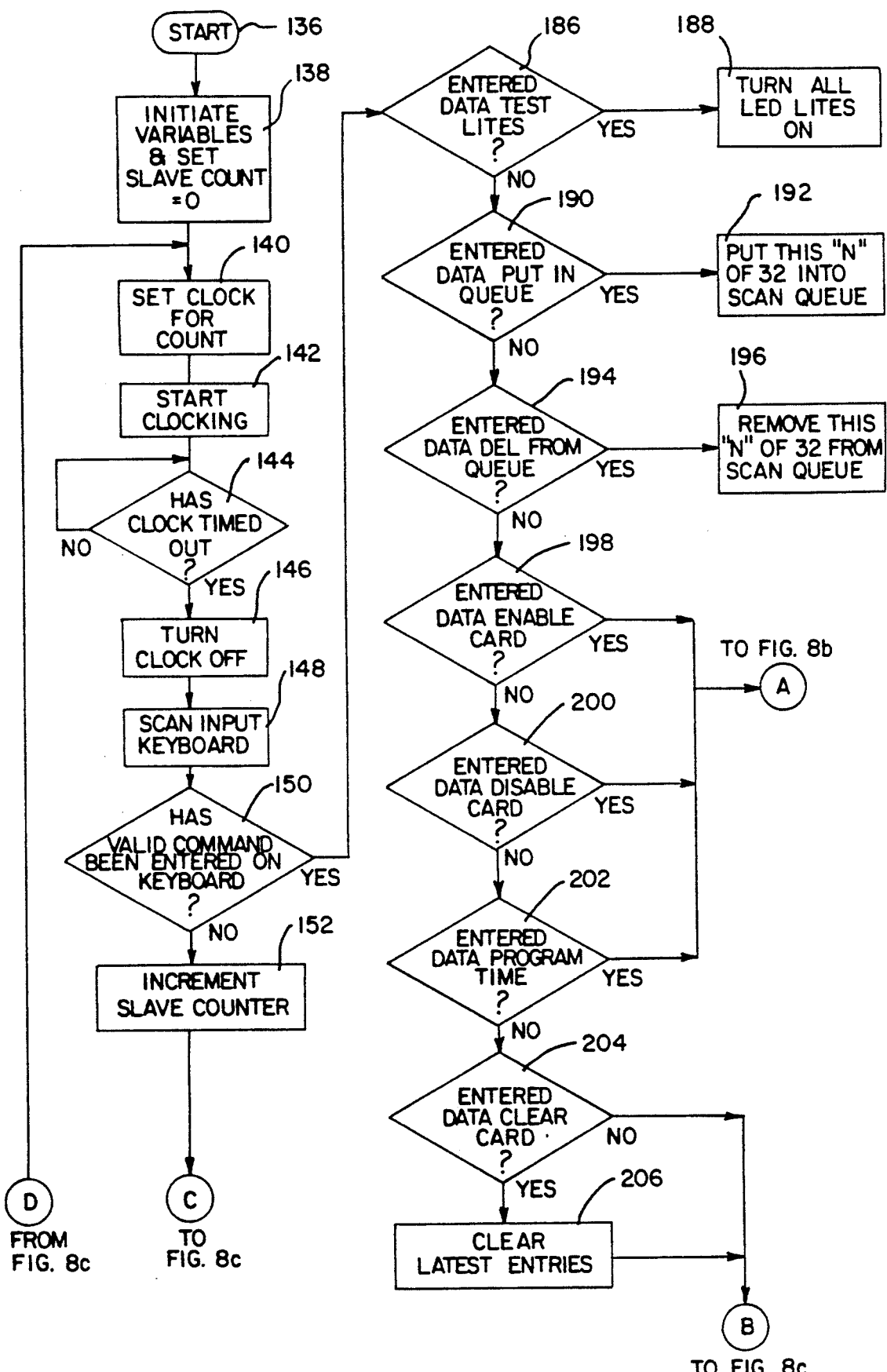
Figure 8C:
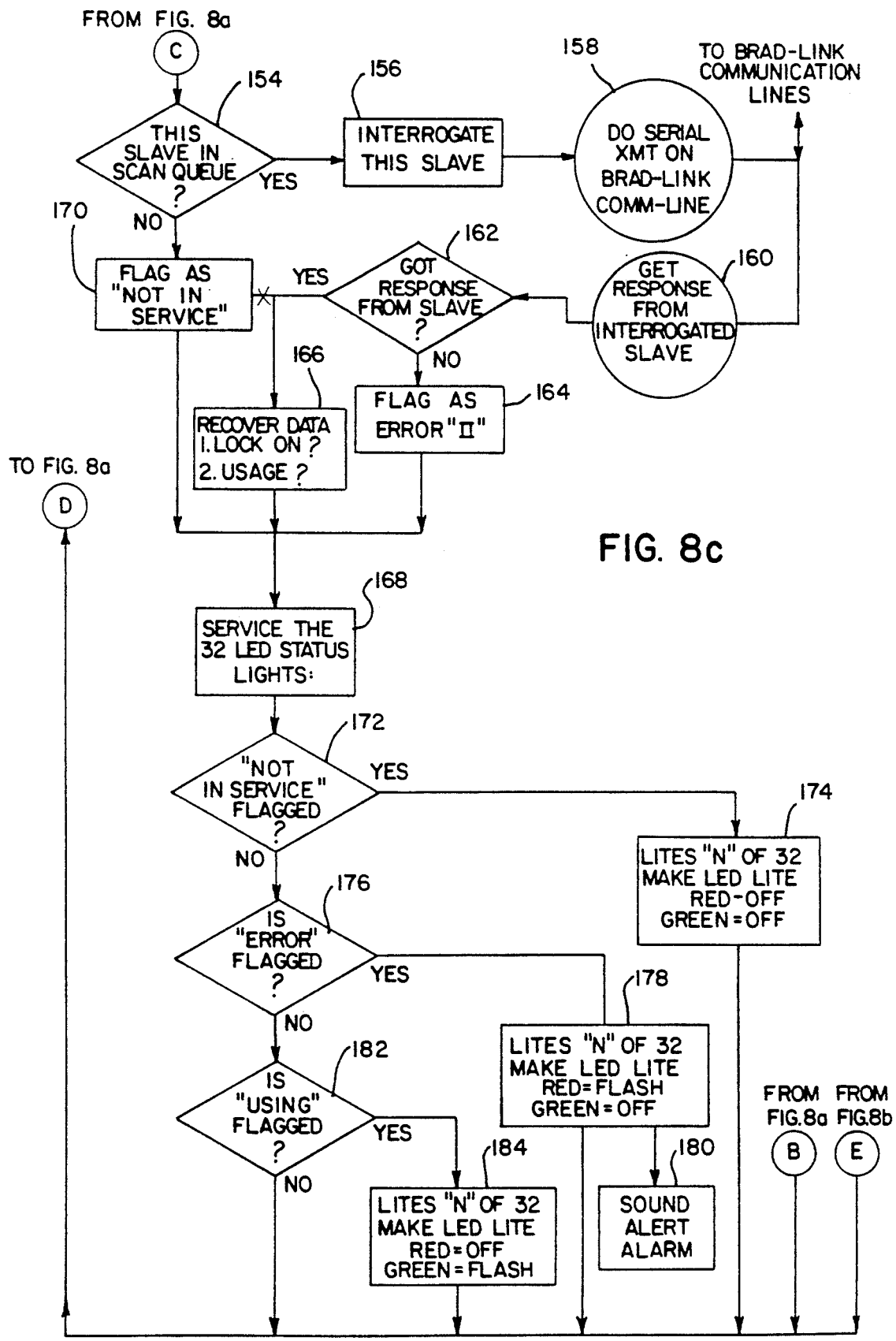

FIGS. 8a through 8c together comprise the flowchart for the software that operates the master controller depicted and described in connection with FIGS. 3 and 4 discussed above. The software is preferably written in C language.

After the software starts running at step 136, all the variables are initialized and the slave count is set to zero at step 138. In this particular example, thirty-two slave control circuits are used, with each having its own identification number between one and thirty-two. The microprocessor clock is then set to 8 milliseconds at step 140, which is the time that it takes for one complete loop of the software. One 8 millisecond time frame is allocated to each slave circuit. The clock is started at step 142, and a determination is made at step 144 whether the 8 millisecond time clock has timed out. If it has not timed out, the software loops back to step 144 until it has timed out. Once the clock has timed out, the clock is turned OFF at step 146 and input keypad 54 of the status panel is scanned at step 148.

A determination is then made at step 150 whether any valid commands have been entered on the keypad. If no valid commands have been entered, the slave count is incremented by one at step 152, so that the slave count is now equal to one. The value of the slave count corresponds to the identification number of the slave being interrogated.

Referring now to FIG. 8c, a determination is made at step 154 whether slave 1 is already in the scan queue, that is whether it already is in line to be interrogated by the master controller. If the answer is Yes, slave 1 is interrogated at step 156 and a command sequence is transmitted via the communications bus at step 158 to interrogate the slave.

The system then waits for a response from slave 1 at step 160. A determination is made at step 162 whether a response has been received from slave 1. If no response has been received, an error is noted at step 164. If a response has been received from the slave, the data is recovered from the slave at step 166. The data may either indicate: 1) whether the slave has been locked or disabled for a security check or the like; or 2) whether the plumbing fixtures controlled by the slave are being used at that time.

The program then proceeds to step 168, where the information is sent to the appropriate LED light on the status panel using the procedure discussed above in connection with FIGS. 3 and 4. Note that if slave 1 had not been in the scan queue as determined at step 154, a "Not in Service" flag would have been raised at step 170, and the software would then also proceed to step 168.

A determination is then made at step 172 whether the "Not in Service" flag had been flagged at step 170. If the answer is Yes, both the red LED and the green LED associated with that slave will be turned OFF at step 174. If "Not in Service" was not flagged at step 170, a determination is made at step 176 whether an Error has been flagged at step 164. If an Error has been flagged, the red LED associated with slave 1 is flashed, and the green LED is turned OFF at step 178. The alarm is then sounded at step 180 to indicate that there is an Error in the system. If an Error has not been flagged, a determination is made at step 182 whether the data received at step 166 indicates that the slave is being used. If the slave is being used, the corresponding red LED is turned OFF, and the green LED is flashed at step 184.

The software routine then returns to the portion depicted in FIG. 8a, as indicated by "D" in FIG. 8c. Referring now to FIG. 8a, if a valid command has been entered via keyboard 54 at step 150, a determination is made at step 186 whether the entered command data is intended to test the LED lights. If the answer is Yes, all the LED lights are turned ON at step 188. If the answer is No, a determination is made at step 190 whether the entered command data is the type which is to be put in the scan queue, that is whether it identifies a particular slave. If the answer is Yes, the slave identification number is placed into the scan queue at step 192 so that the slave will be interrogated at step 156 (FIG. 8c). If the answer at step 190 is No, a determination is made at step 194 whether the command data indicates that a slave identification number should be deleted from the scan queue. If the answer is Yes, that slave identification number is deleted from the scan queue at step 196 so that the slave will not be interrogated at step 156. If the answer at step 194 is No, a determination is made at step 198 whether the entered command data is designed to enable the particular slave to operate. If the answer at step 198 is No, a determination is made at step 200 whether the entered command data is intended to disable the particular slave. If the answer at step 200 is No, a determination is made at step 202 whether the entered command data is valve timing data. If the answer is No, a determination is made at step 204 whether the entered command data is intended to clear all of the memory registers for that particular slave. If the answer at step 204 is Yes, the memory locations corresponding to that slave are cleared at step 206. The software then proceeds to the Fortion labeled "B" in FIG. 8c.

If the answer was Yes at steps 198, 200 or 202, the routine proceeds to that portion depicted in FIG. 8b. In FIG. 8b, a determination is then made at step 208 whether the entered data related to one particular slave. If the answer is No, a determination is made at step 210 whether the entered data related to a lower tier of prison cells/slaves. If answer at step 210 is No, a determination is made at step 210 whether the entered data is intended for an upper tier of cells/slaves. If the answer is No, a determination is made at step 214 whether the entered data is intended for all of a particular type of water dispensing fixtures such as showers. If the answer at step 214 is No, a determination is made at step 216 whether the entered data is directed to all of the fixtures which have been paired together in the Comby mode. If the answer at step 216 is No, a determination is made at step 218 whether the entered data is intended for all the fixtures in the water control system. If the answer at step 218 is No, the routine proceeds to "E" shown in FIG. 8c, and thus to "D" of FIG. 8a. That is, the loop has been finished, and a new loop of the routine is started for the next slave, slave 2.

Referring again to FIG. 8b, if the answer at any of steps 208 through 218 is Yes, the particular type of data is processed at step 220 and is sent serially to the correct slave or slaves via communication bus lines 46 and 48 of FIG. 1.

A key feature of the present invention is that not only can valve timing data be input and readily changed, but the mode of operation of the valve and thus of its associated fixtures may also be readily changed without changing the hardware or reprogramming the system. Thus, the same gas or liquid control system may be used in a wide variety of applications instead of having a master controller and/or slave circuits which are dedicated to only a particular application.

Some examples of the modes which may be input and readily changed include the following:

1) Changing from a shower mode where the ON time may be several minutes, to a toilet flush mode, where the ON time will only be several seconds.

2) Changing from a shower or faucet mode where the slave circuit controls both hot and cold water, to a toilet mode which uses only cold water.

3) A meter-only mode in which the push of a button starts the metering ON cycle and the metering cycle runs its full course even if the button is pushed repeatedly.

4) A double-touch mode in which one touch of a button starts the valve ON cycle, and a second touch of the button ends the ON cycle whenever the button is pressed. A particular application would be for a health club where control of the fixture is in the hands of the user.

5) A restart mode in which a push of a button starts the cycle and a second push of the button, whenever it occurs, restarts the cycle to enable the user to extend the cycle time. A typical application may be a water fountain.

6) A simultaneous shut-off mode in which two solenoid valves are paired to operate a fixture's hot and cold water supplies so that both shut off at the same time. This would be used in shower or faucet applications to prevent the user from being scalded.

7) A comby mode is which two combination lavatory/water closet units are paired to operate together.

8) A block-out mode, which prevents the initiation of a second valve ON cycle for a preset length of time after the completion of a first valve ON cycle. It may be used in a school application to prevent intentional water waste as a result of vandalism or the like.

9) A group mode, in which a group of plumbing fixtures is activated, whenever any fixture in that group is activated. A typical application may be a group shower following a physical education class.

Many different types of input devices may be used to input the valve mode data corresponding to the different modes discussed above or to change the valve modes. Some typical input devices include dual-inline-package (DIP) switches, a keypad like keypad 54 discussed above in FIG. 2, a personal computer, an ultraviolet or infrared radiation sensor, a sonar sensor, or a touch screen. In a preferred embodiment discussed herein, a keypad is used on the master controller to input valve mode and valve timing data, whereas DIP switches are used to input valve mode data for each of the individual slave control circuits.

Another feature of the present invention is the manner in which valve timing data is input. On the master control panel, valve timing data is input via the keypad 54 discussed above. However, valve timing data may also be input at the individual slave circuits by holding down a push button switch for the desired length of time as discussed herein.

SLAVE CONTROL CIRCUIT

Figure 6:
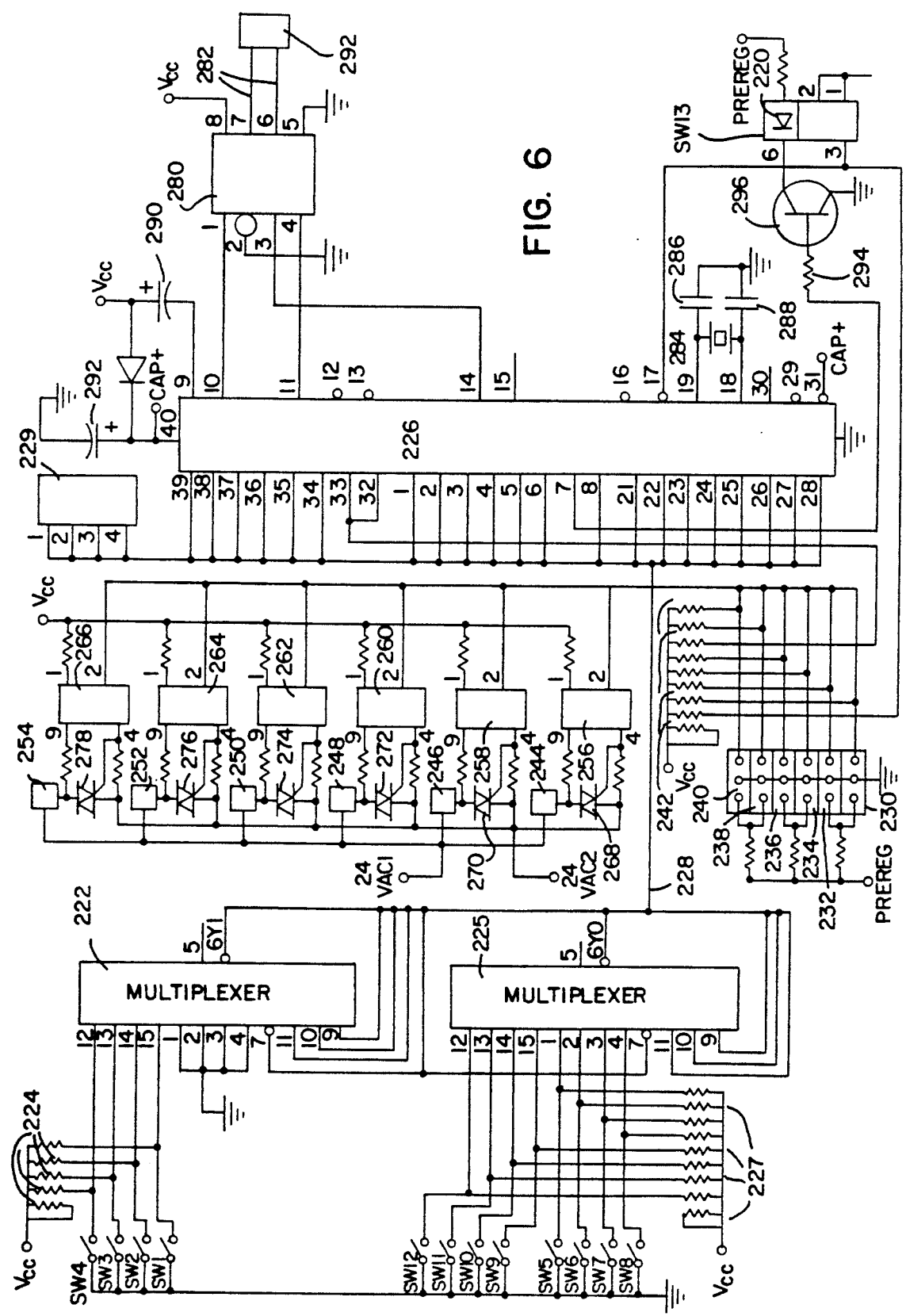
FIG. 6 is a schematic diagram of a slave control circuit according to the present invention.

FIG. 6 is a schematic diagram of a slave control circuit according to the present invention. Switches SW1 through SW12 are used to input the valve mode data. Although these switches are shown as being distinct switches, they are preferably contained in two banks of DIP switches, Part No. 76CB125 made by Grayhill of LaGrange, Ill. Switch SW1 identifies to the slave control software (FIGS. 9a through 9g) whether a master controller and status panel are being used with the system. Switch SW1 being ON indicates that the slave is connected via a data bus to a master controller, and that any transmissions from the slave will be made to the master controller.

Switch SW2 being ON indicates that a communications bus exists. Thus, if switch SW1 is ON, then switch SW2 will also be ON. Switch SW1 being OFF and switch SW2 being ON indicates that there is no master controller or status panel, but that a communications bus exists between the slaves so they may talk directly to each other. Switch SW3 is used to set a specific and unique identification or address for the particular slave. When switch SW3 is ON, the timing program switch SW13 is depressed to input the slave ID number. The operator counts the number of times that LED 220 of switch SW13 blinks to verify that the correct identification number has been input. For example, if the identification number is five, then the LED will blink five times. Switch SW3 is then turned OFF after the identification or address has been set.

Switch SW4 is used to set the double-touch mode discussed above. If switch SW4 is ON, the slave is set to operate all of its associated valves in the double-touch mode. When Switch SW5 is ON, the slave circuit is told that any time data programmed via switch SW12 is to be considered a delay or valve OFF time and not a valve ON time. Switch SW6 is a test mode switch so that when it is ON, the presence of any input will cause all the LEDs on the status panel to go ON to verify that they are operational.

When switch SW7 is OFF, the pressing of switch SW13 will program in valve timing data. However, when switch SW7 is ON, the pressing of switch SW13 automatically programs the flush time of a Comby unit. Switches SW8, SW9, and SW10 are not used in this particular example.

When switch SW11 is ON, the slave is identified as being in a Comby mode configuration. The first four solenoid valves controlled by the slave will receive valve timing data which indicates that they are operating showers or faucets, whereas the last two solenoid valves will receive valve timing data to control toilet flush times.

If switch SW12 is turned ON, any valve timing data input via switch SW13 will be a lockout or block time which will prevent the operation of the valve for the preset block time after the valve ON cycle has been completed. Switch SW12 is turned OFF after the lockout time has been programmed. For example, if switches SW5, SW11 and SW12 are turned ON, any time programmed in via switch SW13 will be used to prevent the flushing of the toilets in a Comby mode for a predetermined amount of time after the last flush.

The status of switches SW1 through SW4 are input to multiplexer 222 at pins 15 through 12 respectively. Resistors 224 act as pull-up resistors for pins 12 through 15. Similarly, the status of switches SW5 through SW8 are input to pins 1 through 4 respectively of multiplexer 225, and the status of switches SW9 through SW12 are input to pins 15 through 12 respectively of multiplexer 225. Multiplexers 222 and 225 are preferably Model No. HC151 multiplexers manufactured by National Semiconductor of California. Resistors 227 are pull-up resistors for switches SW5 through SW12.

The signals from switches SW1 through SW12 together comprise a 12 bit word that is input to slave control microprocessor 226 via bus 228. However, processor 226 operates in binary coded decimal (BCD) format, using 16 bit binary words. The remaining 4 bits are addresses for each of the multiplexers. Processor 226 is preferably a Model No. 87C51BH microprocessor manufactured by Signetics Corp. of California.

The address information is provided by multiplexers 222 and 225 at their respective pins 7, 9, 10 and 11 to input pins 3, 4, 5 and 6 of processor 226. The address information is also stored in a non-volatile memory device 229 and is input thereto via its pins 1 through 4. Digital memory device 229 also stores the valve timing data and the valve mode data, so that this information will not be lost if power to the water control system is disrupted. Memory device 229 is preferably a Part No. 9306 manufactured by National Semiconductor of California.

The valve mode data, which is input via switches SW1 through SW12, are sequentially transmitted from multiplexers 222 and 225 via bus 228 to pins 2 and 1 respectively of processor 226. Processor 226 periodically interrogates multiplexers 222 and 225 as discussed below to obtain the valve mode data and any changed valve mode data.

The slave control circuit depicted in FIG. 6 is intended to operate six valves and thus six water dispensing fixtures. Each of the fixtures may have associated with it a push button switch activated by the user to inform processor 226 of the action which is desired. Each of the push button switches preferably includes a Hall sensor which provides signals to microprocessor 226. The push button switches are connected to junctions 230 through 240, which are three pin connectors. The outputs of junctions 230 through 240 are connected to pins 21 through 26 respectively of processor 226. Resistors 242 are pull-up resistors for pins 21 through 26. When one of the push button switches is pressed, the associated input of processor 226 is biased to a low state to inform the processor that the button has been pushed. Each of connectors 230 to 240 is connected to 33 volts of pre-regulated power obtained from the power supply depicted in FIG. 7.

Processor 226 and many of the other components of the slave control circuit are powered by 5 volts DC of regulated power, as indicated by the letters Vcc in FIG. 6. This very clean 5 VDC is also obtained as an output from the slave circuit power supply depicted in FIG. 7.

Since processor 226 provides 5 VDC control signals and since 24 VAC is being switched across the solenoid valves, a bridge is needed between the two systems. This bridge is comprised of an opto isolator and a triac that is associated with each of the six solenoid valves. More particularly, each solenoid valve (not shown) is connected to one of connectors 244 through 254. Each of the solenoid valves also has an associated opto isolator 256 through 266 and a triac 268 through 278, respectively. Opto isolators 256 through 266 are tied to output pins 34 through 39, respectively, of processor 226. Whenever the signal on its associated processor pin goes to a low state, pin 2 of the associated opto isolator will also go to a low state, causing the LED within the opto isolator to be turned ON. The turning ON of the LED provides a trigger for an internal triac (not shown) within the opto isolator. The turning ON of the internal triac causes one of triacs 268 through 278 to be turned ON, which allows a 24 VAC signal to be switched to the corresponding solenoid valve via one of connectors 244 through 254 respectively. Opto isolators 256 through 266 and triacs 268 through 278 are available from Motorola of Phoenix, Ariz.

Pin 7 of microprocessor 226 is connected to the output of switch SW13 so that valve timing data is provided to processor 226. Pin 8 is not used. Pins 10 through 17 are configured as input/outputs. Pins 10 and 11 control the serial transmission of information via the communications bus discussed above. Pin 10 receives information from the communications bus, and pin 11 transmits information to the communications bus. Chip 280 is an RS 485 transceiver integrated circuit, Part No. 75176 made by National Semiconductor, that is used to control the serial traffic into or out of processor 226 and communications bus 282. Pin 14 of the microprocessor is used to toggle circuit 280 between the send and the receive modes. Connector 292 connects bus 282 to another slave circuit or to the master controller.

Pin 17 of the microprocessor is an input which recognizes whether push button switch SW13 is being pressed. When switch SW13 is being pressed, pin 17 is grounded and the microprocessor begins a count corresponding to the valve timing data that is being input. When switch SW13 is released, pin 17 returns to its high state and the count ends.

Pins 18 and 19 along with crystal oscillator 284 and capacitors 286 and 288 provide the clock signal to operate processor 226. The clock signal frequency is 11.0592 MHz. Pin 31 is a flag which indicates whether the processor's internal memory or an external memory device should be accessed to locate the software program (FIGS. 9a-9g) for running processor 226. Pin 9 is the reset; if power is interrupted, a delay is imposed during the charge up of capacitor 290 to allow an orderly start up of processor 226. Pin 40 is connected to a capacitor 292 which provides additional filtering of the power provided to the microprocessor via pin 40.

Pin 7 of processor 226 is connected to switch SW13. Pin 7 will bring resistor 294 high once per second, which causes the collector of transistor switch 296 to go low. The collector going low will turn on LED 220 so that it will blink once per second. The blinking of LED 220 indicates that valve timing data is being input. Switch SW13 is preferably a Part No. 96-111 B0.02 made by Grayhill of LaGrange, Ill.

SLAVE CONTROL POWER SUPPLY

Figure 7:
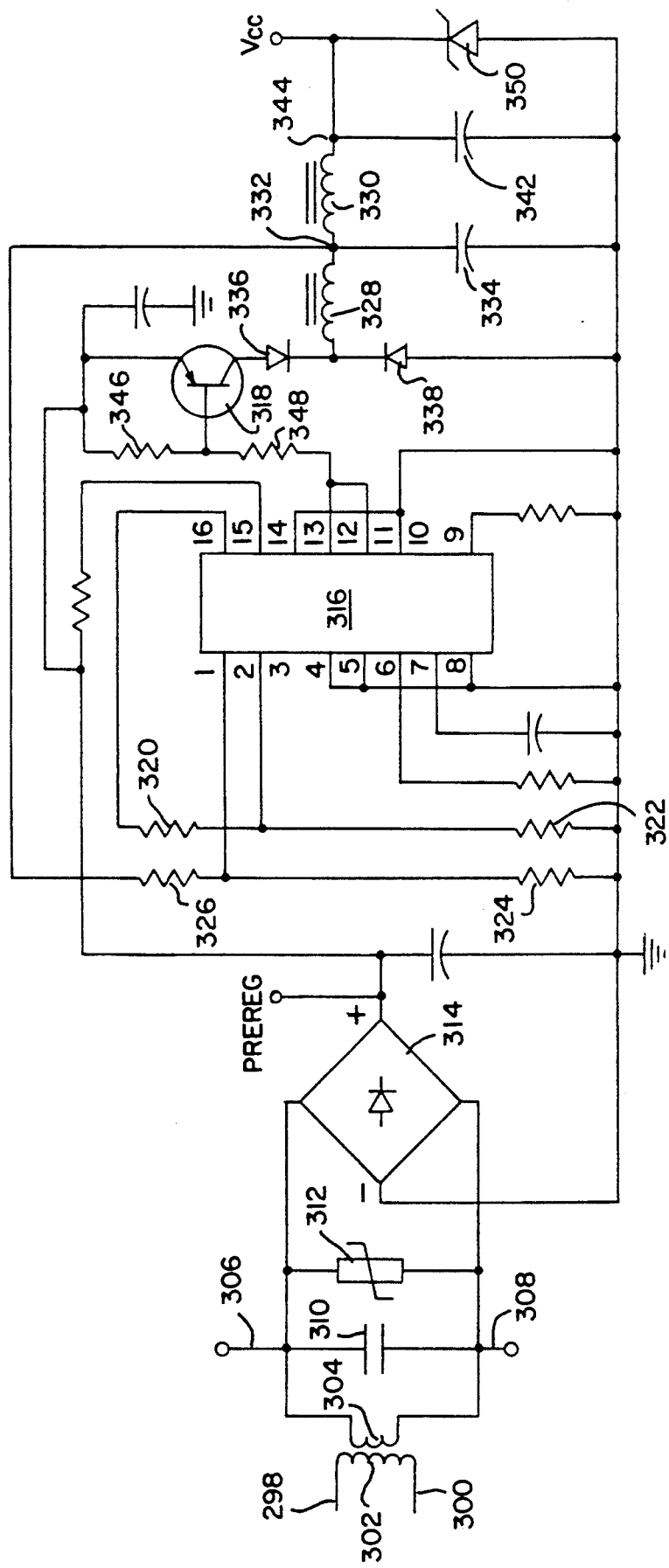
FIG. 7 is a schematic diagram of one of the power supplies used to provide power to a slave control circuit.

FIG. 7 is a schematic diagram depicting the power supply used to power the slave control circuit of FIG. 6. In FIG. 7, 120 VAC is present on lines 298 and 300 and primary transformer winding 302. The voltage is stepped down via the action of winding 302 and secondary winding 304 so that 24 VAC is present on lines 306 and 308. A bypass capacitor 310 eliminates low voltages. A metal oxide varistor 312 is connected across secondary winding 304 to rid of transient signals and to protect against lightening strikes and the like. The unregulated 24 VAC is then provided to a full-wave bridge rectifier 314 whose output is about 33 VDC of unregulated voltage. Bridge rectifier 314 is preferably a Part No. BR82D made by General Instruments of Ohio. This unregulated voltage may be output at the terminal designated PREREG as discussed above in connection with FIG. 6.

This unregulated voltage is then applied to a switch mode power supply that uses pulse width modulation to achieve a very clean 5 VDC output. Pulse width modulator 316 is used to control a switching transistor 318. Modulator 316 is preferably a Model No. CA3524 manufactured by Harris Electronics of Fla.

Resistors 320 and 322 constitute a voltage divider for input pin 2 of modulator 316. Resistors 320 and 322 provide a 5 VDC reference voltage on pin 2. The voltage divider consisting of resistors 324 and 326 is connected to inductors 328 and 330 at junction 332. When junction 332 is at +5 VDC, the voltage signal at junction 332 is transmitted to pin 1 of modulator 316 via the voltage divider consisting of resistors 324 and 326, thereby causing the microprocessor to output a signal on its pin 13 which turns OFF switching transistor 318. If the voltages of inductors 328 and 330 drops below 5 volts, then the difference between the voltage at junction 332 and the +5 VDC reference voltage at pin 2 is computed, and switching transistor 318 is turned ON for an appropriate length of time to cause the voltage at junction 332 to be raised to +5 VDC. In other words, inductors 328 and 330 and capacitor 334 together act as a feedback circuit which allow the voltage at junction 332 and thus output voltage Vcc of the power supply to be precisely controlled at +5 VDC.

Diodes 336 and 338 are fast recovery flyback diodes. The action of diodes 336, 338, and inductors 328 and 330 together comprise a conventional flyback circuit as is well known in power supply applications. The purpose of inductors 328 and 330 is to smooth out the current when transistor 318 is turned OFF. Capacitor 342 provides additional filtering to minimize the approximately 10 millivolts of ripple which is present at junction 344. Resistors 346 and 348 constitute a voltage divider that is connected to the base of transistor 318. Zener diode 350 is set at about 5.6 volts to protect the power supply from transients present on the line.

SLAVE CONTROL SOFTWARE

FIGS. 9a through 9g together comprise the software program used to operate the slave control circuit depicted in FIG. 6. The program is started at step 352, and constants and variables are initialized at step 354. The timer clock is then set to zero or to some other known value at step 356. The timer clock counts up from the preset amount to 1/14th of a second, which is the time it takes for the program to run. A determination is then made at step 358 whether the clock count has overflowed, or has reached 1/14th of a second. If the answer is No, then a determination is made at step 360 whether any valid message has been received on the communications bus. If the answer is No, then step 358 is repeated, thereby establishing a loop until either the count is overflowed or a valid message is received on the bus.

If the count has overflowed at step 358, the time for running the program has ended so the timer should be reset at step 362. Since the program is allowed 1/14th of a second to run but it generally does not take that long to run, the count is forced to overflow until 1/14th of a second has passed. The timer is reset at step 362 when this time period has elapsed.

A determination is then made at step 364 whether one complete second has elapsed, since the slave processor only interrogates the input switches once per second. When the flag at step 364 is equal to one, a determination is made at step 366 whether the program hold count is equal to zero. This count is equal to zero only on the first pass of the software per second. If this count is equal to zero, the DIP switches or other input device are read at step 368 and decoded. If the program hold count is not equal to zero, then the switches should not be interrogated. The next step 370 is then to determine whether valve timing data is being input via the program time switch. Note that if the answer at step 364 is No, the tick counter is incremented by one at step 372.

If the program time switch is being depressed, the program time counter is incremented at step 374 and a determination is made at step 376 whether the program time is less than one. The program time will only be less than one during the first pass through the program per second, which is the only time that the DIP switches are to be read and decoded at step 378. At all other times the program time counter will be greater than or equal to one, and the DIP switches are not read.

In that event, a determination is made at step 380 whether the time being input via step 370 is the flush time of a toilet. If so, then timers 6 and 7 are cleared since they contain the prior flush times of the toilet. There is one timer location designated for each of the solenoid valves controlled by the slave circuit. These correspond to timers 0 through 5. Timers 6 and 7 are designated as flush timers. If the valve timing data being entered is not a flush time, then all of the timers are cleared. The LED on the push button switch SW13 is then blinked at step 382 once per second to indicate that timing data is being entered.

Figure 9A:
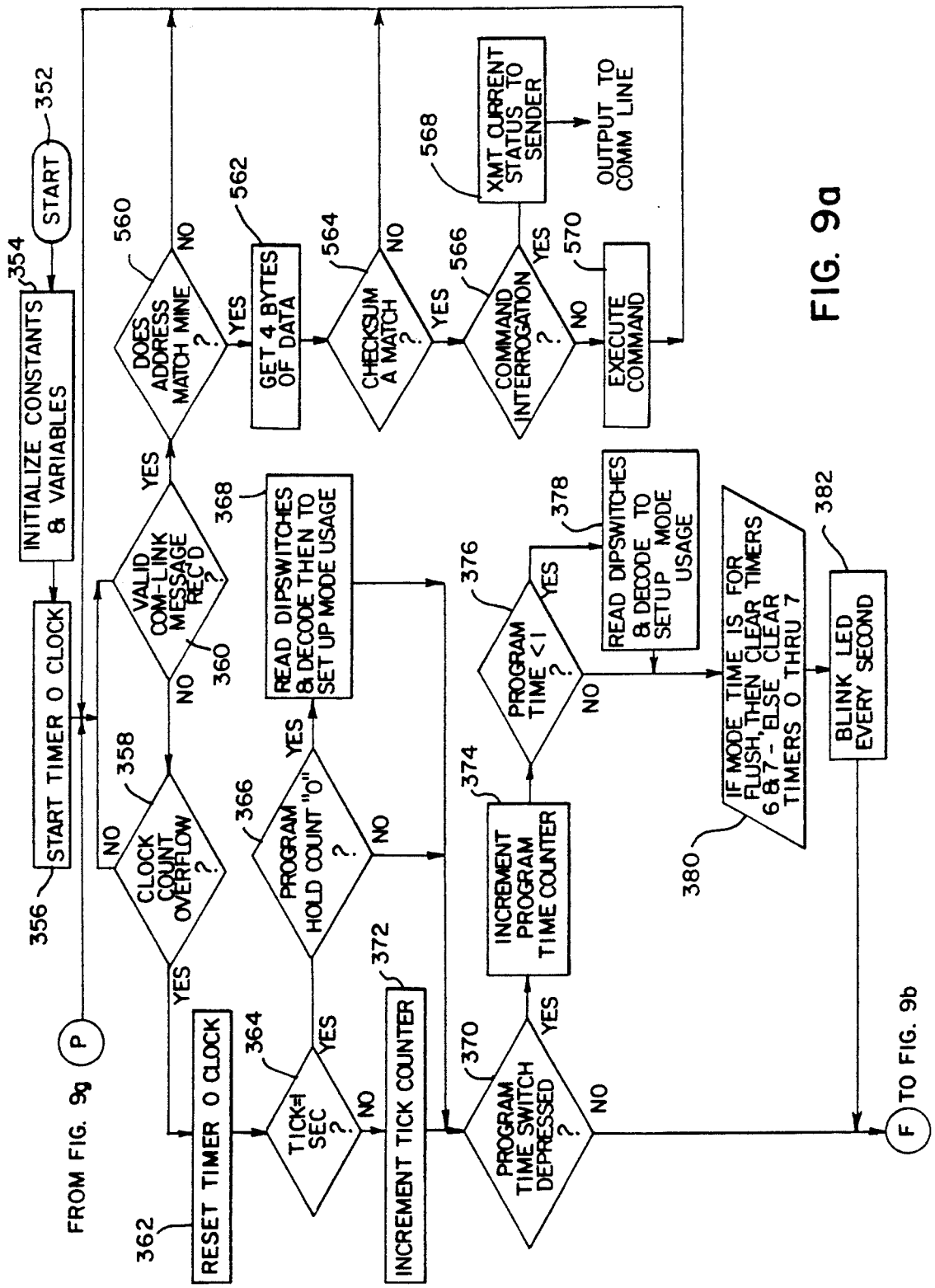
Figure 9B:
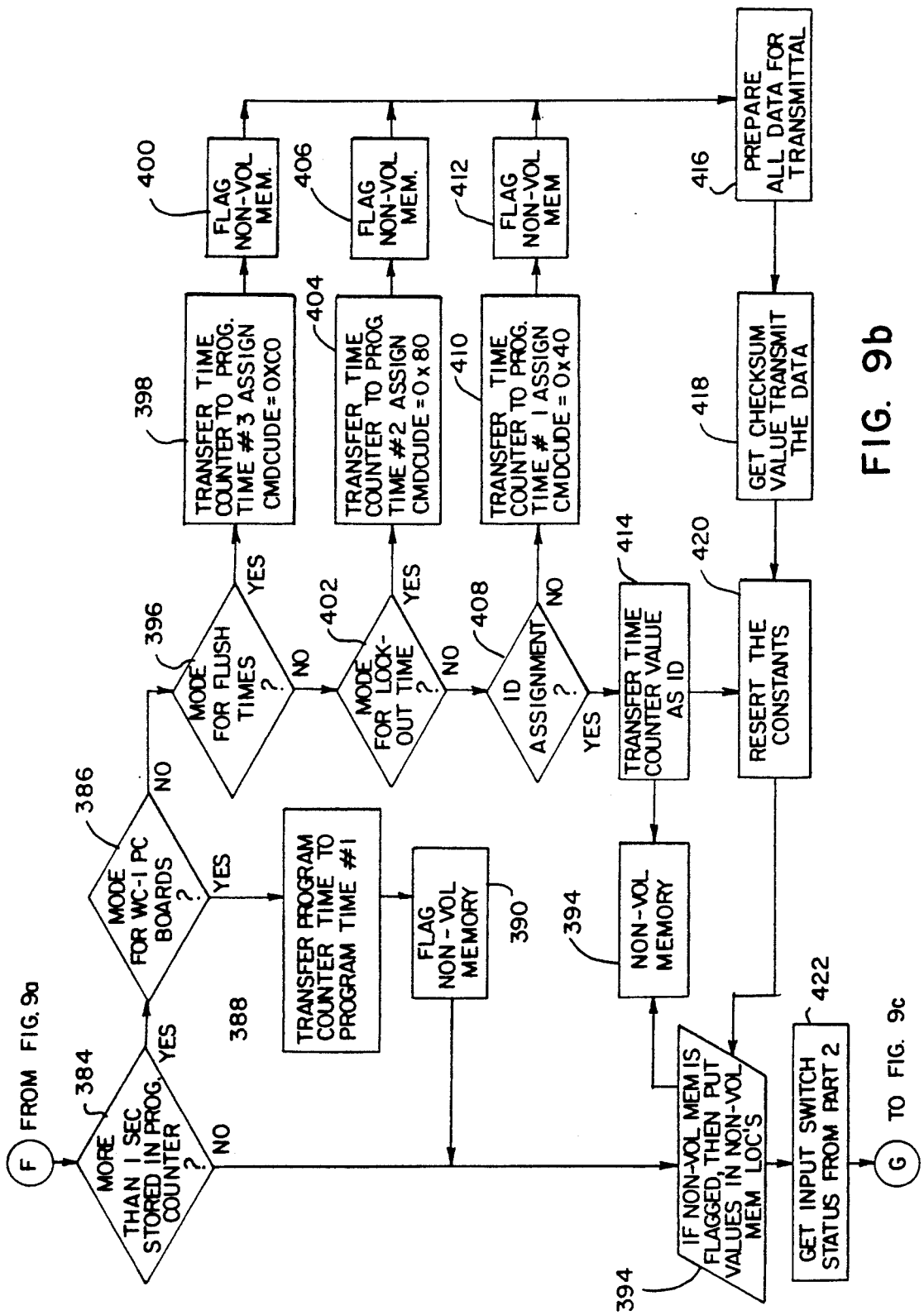

Referring now to FIG. 9b, the program then determines at step 384 whether more than one second is stored in the program time counter, similar to step 376. If the answer is Yes, then the DIP switches have already been interrogated this second and should not be interrogated again.

The program then determines the nature of the information which has been read from the DIP switches. At step 386 a determination is made whether the valve mode data input via the DIP switches is for a particular type of application called a WC1 board. A WC1 board is one which only accepts a lavatory/shower configuration, so a Yes answer at step 386 indicates that it must be a lavatory/shower configuration. A WC1 board does not have DIP switches, but does have a microprocessor. Thus, it is dedicated to a particular mode.

In any event, if the answer at step 386 is Yes, the timer count value input via switch SW13 is transferred to program timer location number one at step 388, and the non-volatile memory is flagged at step 390 to indicate that the data at step 388 has not yet been transferred to the non-volatile memory. If the non-volatile memory is flagged at step 390, then the flagged data is placed in the non-volatile memory locations at steps 392 and 394.

If the answer at step 386 is No, a determination is made at step 396 whether the mode set at the DIP switches is that flush times are to be input. If so, the timer count value, which corresponds to the valve timing data, is transferred into a program timer number three at step 398 and the non-volatile memory is flagged at step 400. If the mode is not for flush times, then a determination is made at step 402 whether the mode is for a lock out time. If the answer is Yes, the current timer count value is transferred to program timer number two at step 404 and the non-volatile memory is again flagged at step 406.

If the DIP switches do not indicate a lock out time, a determination is made at step 408 whether they indicate that a slave ID number is being assigned. If the answer is No, then the timer count value is transferred to a program timer number one at step 410 and non-volatile memory is flagged at step 412. If the answer at step 408 is Yes, the current timer count value is used as the ID and is transferred at step 414 to non-volatile memory as the slave ID number.

Any data which has been flagged at steps 400, 406 or 412 is prepared for transmittal at 416 and is transmitted at step 418 along the communications bus after a checksum error check is made at step 418. All the constants are reset at step 420, and the values are actually transmitted to non-volatile memory at step 392. The input DIP switch status is then determined at step 422. Port number two corresponds to the push button switches that the user may use to operate the fixture, which are connected to junctions 230 through 240, discussed above in connection with FIG. 6.

Figure 9C:
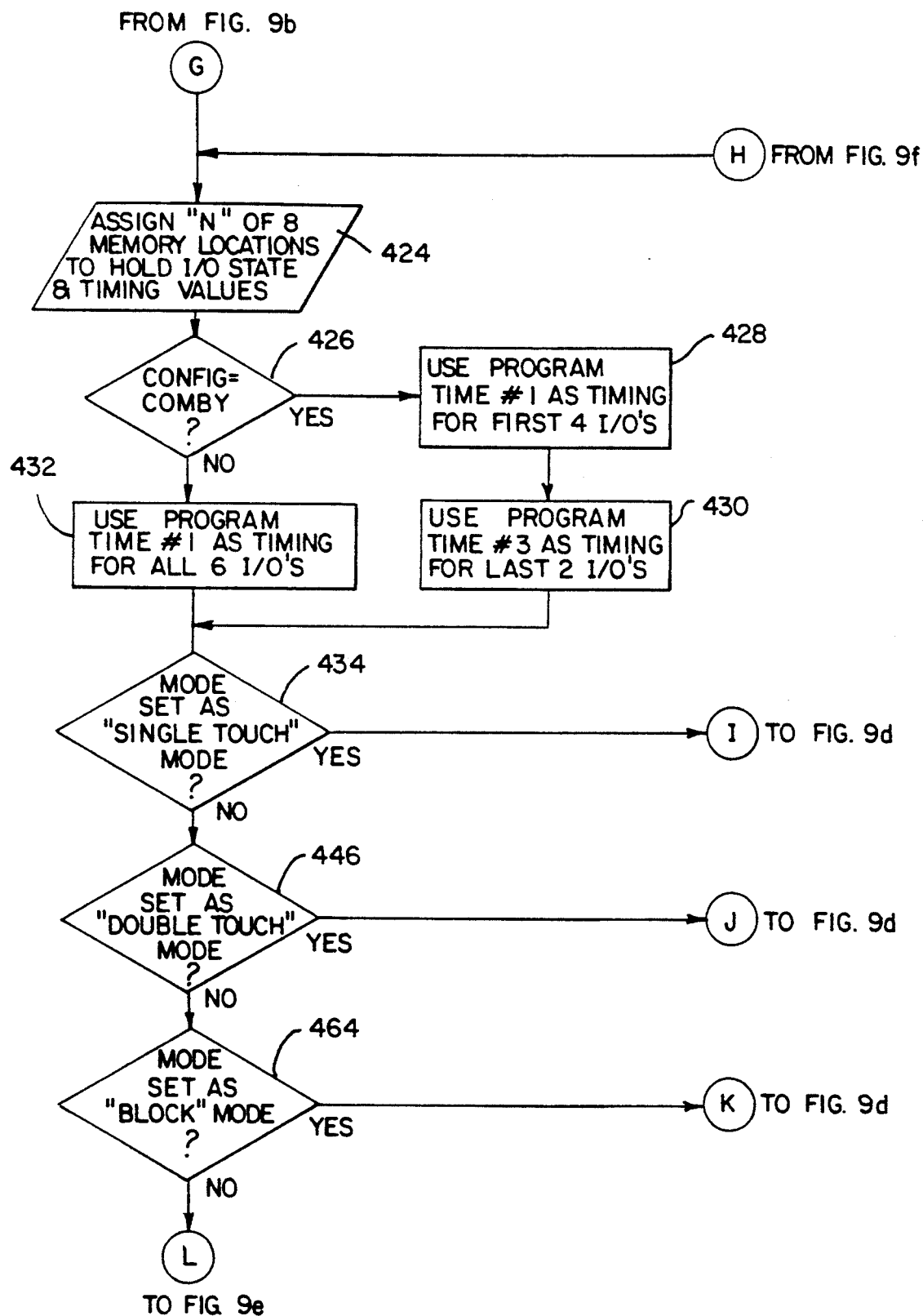

Referring now to FIG. 9c, an array of eight memory locations is assigned at step 424. These locations hold the valve mode data and the valve timing data that is to be output to the solenoid valve.

The software then determines what mode has been set by the DIP switches. A determination is made at step 426 as to whether the Comby mode has been set. If the Comby mode has been set, the program time stored in program timer number one is used at step 428 as the valve timing data for the first four valves. These first four valves will control the hot and cold water that is supplied to the faucets or to the showers of a Comby unit. These times will be relatively long when compared to the flush times, which control the flushing of the associated toilets. At step 430, the program time stored in timer number three is used to control the remaining two valves which in turn control the toilet flushing.

If the mode was not determined to be a Comby mode at step 426, the valve timing data stored in program timer number one is used as the valve timing data for all six valves since all six solenoid valves and their associated fixtures are treated alike. This occurs at step 432.

At step 434, a determination is made whether the mode set at the DIP switches is the single touch mode discussed above. If the answer at step 434 is Yes, a determination is made at step 436 (FIG. 9d) as to which of the N valves was pressed to yield the single touch input. If the button which was pressed can validly be used to operate a device in a single touch mode as determined at step 438, the software goes through a debouncing routine at steps 440 and 442 to determine whether the button was actually pushed or whether it is really a transient on the line. If the debouncing routine indicates that the button was validly pushed, a determination is made at step 442 whether the button has been properly released. If so, the program time counter value is placed into the timer location corresponding to that particular button or valve at step 444.

Returning again to FIG. 9c, if the determination at step 434 indicates that the mode is not a single touch mode, a determination is then made at step 446 whether the mode has been set to a double-touch mode. If the answer is Yes, a determination is made at step 448 (FIG. 9d) as to which button has been pressed by the user. If the button was validly pressed as determined at step 450, a determination is made at step 452 whether the timer corresponding to that valve has any remaining time on it. If the answer is Yes, the double-touch mode is flagged and the timer corresponding to that valve is reset to zero at step 454 so that the complete cycle may begin, as is characteristic of the double-touch mode. If the timer has no remaining time, the debounce routine is run at step 456 to determine whether the button was actually properly pushed. If the button was properly pushed and the debounce routine is not completed, the debounce timer is incremented and the associated valve timer is set to zero at step 458.

If a valid input request has not been received at step 450, a debounce routine is run at step 460. When the debounce procedure is completed, the current program time count value is placed into the timer location corresponding to the valve at step 462.

Referring again to FIG. 9c, if the mode set via the DIP switches is not the double-touch mode, a determination is made at step 464 whether the mode set by the DIP switches is the block out mode. If the block out mode has been set, the routine next goes to step 466 (FIG. 9d).

At step 466, the particular push button which has been pressed is determined at step 466 using a masking process. A determination is then made at step 468 whether the pushed button constitutes a valid input request for that valve and, if so, step 470 determines whether the associated valve timer still has any time remaining on it. If no time remains, a debounce clock is incremented at step 472. If the timer still has time remaining on it, the button is debounced at step 474 and the timer counter value is placed into the timer location corresponding to that valve at step 476. At step 478, a flag indicates that the block mode is being used.

Figure 9E:
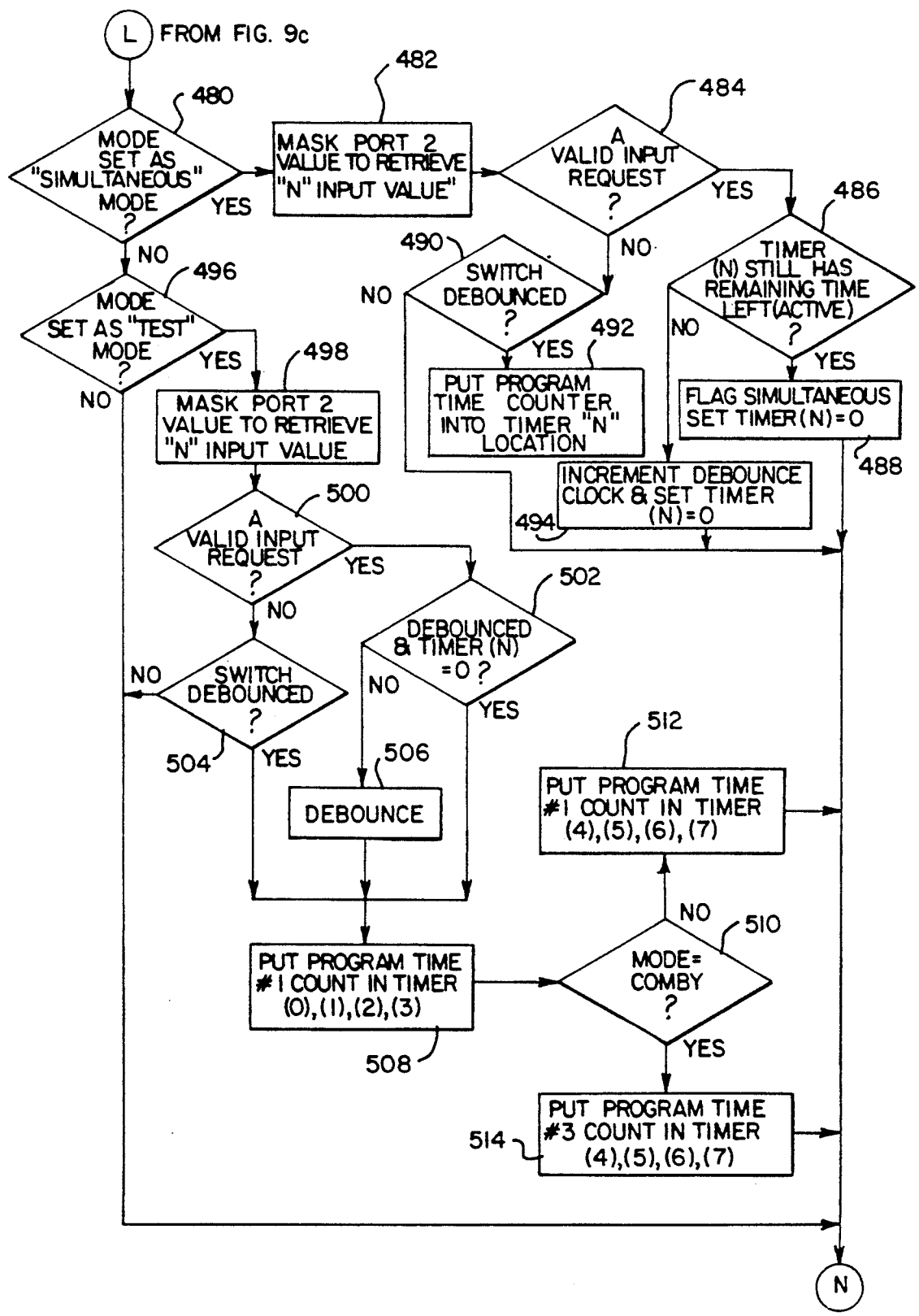
Figure 9F:
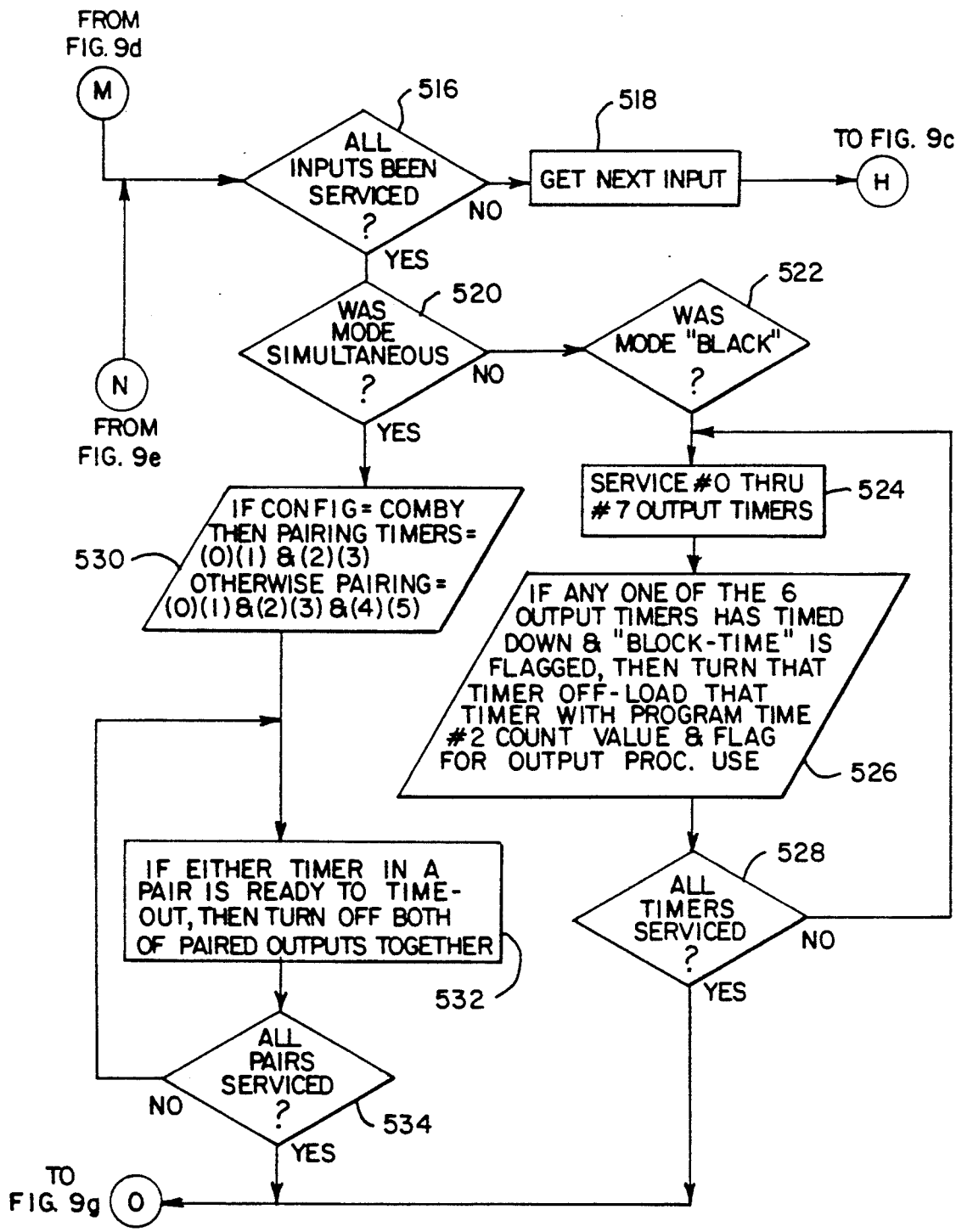
Figure 9G:
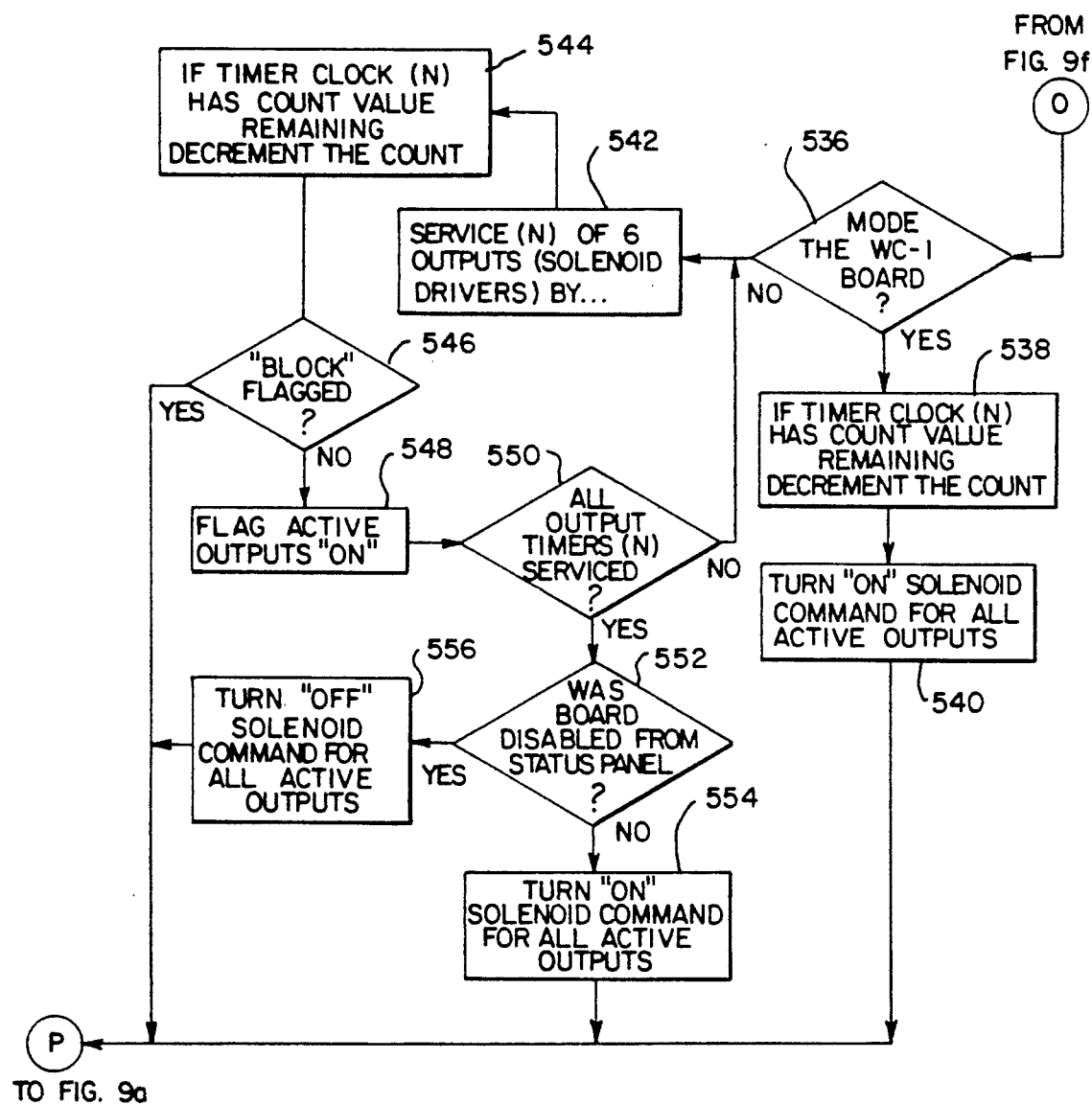

Referring to FIG. 9c, if a block mode has not been set, a determination is then made at step 480 (FIG. 9e) whether the mode has been set to a simultaneous mode. As shown in FIG. 9e, if the answer is Yes at step 480, a masking process is used at step 482 to determine which of the DIP switches has been turned ON. Once that determination has been made, a determination is made at step 484 whether a valid input request has been received when the user pressed the fixture operating button. If the answer at step 484 is Yes, a determination is made at step 486 whether there is any time still remaining on the timer associated with that fixture and that valve. If the answer is Yes, a flag indicates that the simultaneous mode has been set and the timer for that valve is set to zero at step 488.

If a valid input request is not received at step 484, the button is debounced at step 490, and the time count is placed into the timer location corresponding to that valve at step 492. If there is no time remaining at step 486, the debounce clock is incremented and the timer is set to zero at step 494.

If the mode is not the simultaneous mode as determined at step 480, a determination is made at step 496 whether the mode is the test mode. If the answer is Yes, a masking technique is used at step 498 to determine which push button has been operated by the user. If a valid input request is determined to have occurred at step 500, a determination is made at step 502 whether the button has been debounced and whether the timer corresponding to that valve has been set to zero.

If a valid input request is not received, a determination is made at step 504 whether the button has been debounced. If the button has not been debounced at step 502, it is debounced at step 506. The valve timing data is placed in the first four timer locations 0 through 3 at step 508, and then a determination is made at step 510 whether the mode is set to the Comby mode. If the mode is not the Comby mode, the valve timing data is placed in the remaining four timer locations 4 through 7 since all of the timers (valves) are being treated the same. If the mode is the Comby mode, the count in timer number 3 is placed in the remaining four timer locations 4 through 7 at step 514. The routine then proceeds to step 516 of FIG. 9f.

At step 516, a determination is made whether all of the inputs (DIP switches) have been serviced. If they all have not been serviced, the next input is obtained at step 518. If all the inputs have been serviced, a determination is made at step 520 whether the mode was set to the simultaneous mode. If the mode was not the simultaneous mode, a determination is made at step 522 whether it was the block-out mode. If it is the block-out mode, then the appropriate valve timing data is placed on the processor outputs at step 524, which then turn OFF the solenoids. The timers containing valve timing data are then decremented. When any one of these timers has timed down to zero and the block-out time has been flagged, that timer is turned OFF, it is loaded with the program number two count value and is flagged for output processing use at step 524. If all the timers have not been serviced as determined by step 528, the loop is run again until all the output timers containing valve timing data have been serviced.

If the mode is a simultaneous mode as determined at step 520, a determination is made at step 530 whether the mode is also the Comby mode. Is so, then the valve output timers are paired so that timers 0 and 1 are paired together and timers 2 and 3 are paired together. If the mode is not the Comby mode, timers 0 and 1 are paired together, timers 2 and 3 are paired together, and timers 4 and 5 are paired together. Since the valves in each pair are to shut off at the same time, if either timer in a pair is ready to time out, then both timers in the pair are turned OFF at the same time at step 532. A determination is then made at step 534 whether all of the pairs have been serviced. If not, step 532 is repeated. The program then proceeds to step 536 in FIG. 9g.

At step 536, a determination is made whether the mode is set to indicate that a dedicated slave called a WC1 board is being used. If the answer is Yes, the associated timer clock is decremented if it has any time remaining at step 538. All solenoid valves are allowed to operate at step 540 if any time remains.

If the mode is not set for the WC1 board, then all of the six solenoid valves are serviced by placing the appropriate commands on the output lines at step 542. If any of the valve timer clocks have time remaining, the time is decremented at step 544. A determination is then made at step 546 whether the block-out mode has been flagged. If it has been flagged, then none of the solenoid valves are turned ON and the program returns to Start. If the block-out mode has not been flagged, the active valve outputs are flagged ON at step 548 and a determination is made at step 550 whether all the output timers corresponding to those valves have now been serviced. If not, the loop repeats until they all have been serviced.

If all the output timers have been serviced, a determination is made at step 552 whether the particular slave has been disabled from the master controller via the status panel. If it has not been disabled, the solenoids are allowed to operate according to their commands via step 554. If the slave has been disabled, all of the solenoids are turned OFF at step 556.

Referring again to FIG. 9a, if the determination at step 360 indicates that a valid message has been received over the communications bus, a determination is then made at step 560 whether the address of that message matches that of the slave in question. If it does not, the program returns to Start.

If the address does match, 4 bits of data are obtained at step 562 and an error checking routine is run at step 564. If the routine indicates that there are no errors, a determination is made at 564 whether the message received on the data bus is an attempt by the master controller to interrogate the particular slave. If the answer is that it is an interrogation, the current status of the slave is transmitted to the sender at step 568 via the communication data bus. If the command is not an interrogation, the command is executed at 570, which most probably means that the valve timing data and the valve operating data are being changed. The program then returns to Start.

Although the present invention has been described in connection with a prison application, it will be apparent to those skilled in the art that many other applications could be used for the present invention, including irrigation systems, heating, ventilation and air conditioning building management control systems, office building lavatory control systems and the like. Thus, the present invention is not to be limited by the embodiments disclosed herein, but only by the following claims.

We claim:

1. A control system that controls the operation of a plurality of valves, said valves controlling a plurality of gas or liquid dispensing devices, said plurality of dispensing devices including at least first and second distinct types of dispensing devices, said plurality of dispensing devices having at least two dispensing devices of said first type and at least two dispensing devices of said second type, said control system comprising:

an input circuit that accepts valve mode data and valve time data for a first valve of said plurality of valves, said valve mode data determining which mode of a plurality of possible modes in which said first valve is to operate, said mode determining whether said valve responds or fails to respond to an input from said control system or from a dispensing device, and said valve time data determining the length of time that said first valve is to be operated or rendered inoperative;

a valve controller that processes said valve mode data and said valve time data and that generates at least one output signal to control said valve in response to said processed valve mode data and said processed valve time data; and a change circuit that receives changed valve mode data to change said valve mode from a first mode to a second mode, that receives changed valve time data to change the length of time that said first valve is to be operated or rendered inoperative, and that transmits said changed valve mode data and said changed valve time data to said valve controller.

2. The control system of claim 1, wherein said control system also controls the operation of a second valve selected from said plurality of valves, said second valve controlling a different type of dispensing device than said first valve, and wherein said input circuit also accepts second valve mode data that determines the mode in which said second valve is to operate and second valve time data that determines the length of time that said second valve is to be operated or rendered inoperative, said control system further comprising:

a second valve controller that processes said second valve mode data and said second valve time data and that generates at least one second output signal to control said second valve in response to said processed second valve mode data and said processed second valve time data; and a bus that electrically connects said valve controller and said second valve controller.

3. The control system of claim 1, wherein said input circuit includes a push button switch by which valve time data is input.

4. The control system of claim 1, wherein said input circuit includes dual-inline-package (DIP) switches.

5. The control system of claim 1, wherein said input circuit includes a keypad.

6. The control system of claim 1, wherein said input circuit includes a sensor that senses ultraviolet or infrared radiation.

7. The control system of claim 1, wherein said change circuit includes a microprocessor.

8. The control system of claim 1, wherein said change circuit includes:

a master controller that receives said changed valve mode data; and a bus that transmits said changed valve mode data from said master controller to said valve controller.

9. The control system of claim 8, wherein said master controller also receives changed valve time data, and wherein said bus also transmits said changed valve time data to said valve controller.

10. The control system of claim 1, further comprising a storage device that stores said valve mode data and said valve time data.

11. The control system of claim 10, wherein said storage device includes a non-volatile digital memory unit interconnected with said valve controller.

12. The control system of claim 1, wherein said valve controller includes a microprocessor.

13. The control system of claim 1, wherein said first valve is a solenoid valve, and wherein said valve controller includes:

a processor that generates said output signal in response to said valve mode data and said valve time data; and a switch, interconnected with said first valve, that is gated ON in response to said output signal to enable current to flow to said first solenoid valve.

14. The control system of claim 13, wherein said processor periodically interrogates said input circuit to determine whether said valve mode data or said valve time data has changed.

15. The control system of claim 1, wherein each of said liquid dispensing devices is either a shower, a faucet, a toilet, or a sprinkler.

16. The control system of claim 1, wherein each of said gas dispensing devices is either a heater, a ventilator, or an air conditioner.

17. The control system of claim 1, wherein said first valve mode is either a meter only mode, a single touch mode, a double touch mode, or a restart mode.

18. The control system of claim 1, wherein said second valve mode is either a meter only mode, a single touch mode, a double touch mode, or a restart mode.

19. A control system that controls the operation of a first valve and of a second valve, said first valve controlling the flow of a liquid or a gas to a first dispensing device of a first plurality of dispensing devices of a first type, and said second valve controlling the flow of a liquid or a gas to a second dispensing device of a second plurality of dispensing devices of a second type, said second type being distinct from said first type, said control system comprising:

an input circuit that accepts first valve mode data and first valve time data for said fist valve, and that accepts second valve mode data and second valve time data for said second valve, said first and second valve mode data determining which mode of a plurality of possible modes in which their respective valves are to operate, said modes determining whether the respective valves respond or fail to respond to an input from said control system or from a dispensing device, and said first and second valve time data determining the length of time that the respective valve is to be operated or rendered inoperative;

a valve controller that processes said first valve mode data and said first valve time data and that generates a first output signal to operate said first valve, and that also processes said second valve mode data and said second valve time data and that generates a second output signal to operate said second valve; and a change circuit that receives changed first valve mode data, changed first valve time data, changed second valve mode data, and changed second valve time data, and that transmits said changed first valve mode data, said changed first valve time data, said changed second valve mode data, and said changed second valve time data to said controller.

20. The control system of claim 19, wherein said input circuit includes a push button switch by which said first and second valve time data is input.

21. The control system of claim 19, wherein said input circuit includes dual-inline-package (DIP) switches.

22. The control system of claim 19, wherein said input circuit includes a keypad.

23. The control system of claim 19, wherein said input circuit includes a sensor that senses ultraviolet or infrared radiation.

24. The control system of claim 19, wherein said change circuit includes a microprocessor.

25. The control system of claim 19, wherein said change circuit includes:
a master controller that receives said changed first valve mode data; and
a bus that transmits said changed first valve mode data from said master controller to said valve controller.

26. The control system of claim 25, wherein said master controller also receives said changed first valve time data, and wherein said bus also transmits said changed first valve time data to said valve controller.

27. The control system of claim 19, further comprising:
a storage device that stores said first valve mode data, said second valve mode data, said first valve time data, and said second valve time data.

28. The control system of claim 27, wherein said storage device includes a non-volatile digital memory unit interconnected with said valve controller.

29. The control system of claim 19, wherein said valve controller includes a microprocessor.

30. The control system of claim 19, wherein said valve controller includes:
a first controller that controls said first valve; and
a second controller that controls said second valve.

31. The control system of claim 19, wherein each of said liquid dispensing devices is either a shower, a faucet, a toilet, or a sprinkler.

32. The control system of claim 19, wherein each of said gas dispensing devices is either a heater, a ventilator, or an air conditioner.

33. The control system of claim 19, wherein said first valve mode data corresponds to either a meter only mode, a single touch mode, a double touch mode, a restart mode, a simultaneous mode, a Comby mode, or a group mode.

34. The control system of claim 19, wherein said change circuit includes a microprocessor.

35. A control system that controls the operation of a first valve which in turn operates a first gas or liquid dispensing device, said first dispensing device being one of a first plurality of dispensing devices of a first type, and said control system controlling the operation of a second valve that in turn controls the operation of a second gas or liquid dispensing device, said second dispensing device being one of a second plurality of dispensing devices of a second type that is distinct from said first type, said control system comprising:

a first slave circuit that operates said first valve, including
a first input circuit that accepts first valve mode data and first valve time data for said first valve, said first valve mode data determining which mode of a plurality of possible modes in which said first valve is to operate, said modes determining whether a valve responds or fails to respond to an input from said control system or from a dispensing device, and said first valve time data determining the length of time that the first valve is to be operated or rendered inoperative;
a first controller that processes said first valve mode data and said first valve time data, and that generates a first output signal to operate said first valve;
a first change circuit that receives changed first valve mode data and changed first valve time data, and that transmits said changed first mode data and said changed first time data to said first controller;

a second slave circuit that operates said second valve, including
a second input circuit that accepts second valve mode data and second valve time data for said second valve, said second valve mode data determining which mode of a plurality of possible modes in which said second valve is to operate, and said second valve time data determining the length of time that the second valve is to be operated or rendered inoperative;
a second controller that processes said second valve mode data and said second valve time data, and that generates a second output signal to operate said second valve;
a second change circuit that receives changed second valve mode data and changed second valve time data, and that transmits said changed second mode data and said changed second time data to said second controller;

a master control circuit that is electrically connected to said first slave circuit and to said second slave circuit, including a third input circuit that accepts first changed valve mode data and second changed valve mode data; and a third controller that processes and transmits said changed first mode data to said first slave circuit, and that processes and transmits said changed second mode data to said second slave circuit.

36. The control system of claim 35, wherein said first slave circuit further comprises:

a first storage device that stores said first valve mode data and said first valve time data; and wherein said second slave circuit further comprises:

a second storage device that stores said second valve mode data and said second valve time data.

37. The control system of claim 35, wherein said first controller includes a first processor, wherein said second controller includes a second processor, and wherein said third controller includes a third processor.

38. The control system of claim 35, wherein said first change circuit includes a first processor, and wherein said second change circuit includes a second processor.

39. The control system of claim 35, wherein each of said liquid dispensing devices is either a shower, a faucet, a toilet, or a sprinkler.

40. The control system of claim 35, wherein each of said gas dispensing device is either a heater, a ventilator, or an air conditioner.

41. A control system that controls the operation of at least one valve, said valve controlling the flow of a liquid or gas to a dispensing device, comprising:

an input circuit that accepts valve mode data and valve time data for said valve, said valve mode data determining which mode of a plurality of possible modes in which said valve is to operate, said mode determining whether said valve responds or fails to respond to an input from said control system or from a dispensing device, and said valve time data determining the length of time that said valve is to be operated or rendered inoperative, said input circuit including a multiplexer that sequentially transmits said valve mode data to a valve controller;

a valve controller that processes said valve mode data and said valve time data and that generates at least one output signal to control said valve in response to said processed valve mode data and said processed valve time data; and a change circuit that receives changed valve mode data to change said valve mode from a first mode to a second mode, that receives changed valve time data to change the length of time that said valve is to be operated or rendered inoperative, and that transmits said changed valve mode data and said changed valve time data to said valve controller.

42. A control system that controls the operation of at least one valve, said valve controlling the flow of a liquid or gas to a dispensing device, comprising:

an input circuit that accepts valve mode data and valve time data for said valve, said valve mode data determining which mode of a plurality of possible modes in which said valve is to operate, said mode determining whether said valve responds or fails to respond to an input from said control system or from a dispensing device, and said valve time data determining the length of time that said valve is to be operated or rendered inoperative;

a valve controller that processes said valve mode data and said valve time data and that generates at least one output signal to control said valve in response to said processed valve mode data and said processed valve time data; and a change circuit, including a multiplexer, that receives changed valve mode data to change said valve mode from a first mode to a second mode, that receives changed valve time data to change the length of time that said valve is to be operated or rendered inoperative, and that transmits said changed valve mode data and said changed valve time data to said valve controller.

43. A control system that controls the operation of a first valve and of a second valve, said first valve controlling the flow of a liquid or gas to a first dispensing device, and said second valve controlling the flow of a liquid or a gas to a second dispensing device, said control system comprising:

an input circuit that accepts first valve mode data and first valve time data for said first valve, and that accepts second valve mode data and second valve time data for said second valve, said first and second valve mode data determining which mode of a plurality of possible modes in which their respective valves are to operate, said modes determining whether the respective valves respond or fail to respond to an input from said control system or from a dispensing device, and said first and second valve time data determining the length of time that the respective valve is to be operated or rendered inoperative, said input circuit also including a multiplexer that sequentially transmits said first valve mode data and said second valve mode data to a value controller;

a valve controller that processes said first valve mode data and said first valve time data and that generates a first output signal to operate said first valve, and that also processes said second valve mode data and said second valve time data and that generates a second output signal to operate said second valve; and a change circuit that receives changes first valve mode data, changed first valve time data, changed second valve mode data, and changed second valve time data, and that transmits said changed first valve mode data, said changed first valve time data, said changed second valve mode data, and said changed second valve time data to said controller.

44. A control system that controls the operation of a first valve and of a second valve, said first valve controlling the flow of a liquid or a gas to a first dispensing device, and said second valve controlling the flow of a liquid or a gas to a second dispensing device, said control system comprising:

an input circuit that accepts first valve mode data and first valve time data for said first valve, and that accepts second valve mode data and second valve time data for said second valve, said first and second valve mode data determining which mode of a plurality of possible modes in which their respective valves are to operate, said modes determining whether the respective valves respond or fail to respond to an input from said control system or from a dispensing device, and said first and second valve time data determining the length of time that the respective valve is to be operated or rendered inoperative;

a valve controller that processes said first valve mode data and said first valve time data and that generates a first output signal to operate said first valve, and that also processes said second valve mode data and said second valve time data and that generates a second output signal to operate said second valve, said valve controller also including:
  a processor that generates said first output signal in response to said first valve mode data, and that generates said second output signal in response to said second valve mode data;
  a switch interconnected with said first valve and with said second valve that controls said first valve in response to said first output signal, and that controls said second valve in response to said second output signal; and
  a change circuit that receives changed first valve mode data, changed first valve time data, changed second valve mode data, and changed second valve time data, and that transmits said changed first valve mode data, said changed first valve time data, said changed second valve mode data, and said changed second valve time data to said controller.

45. The control system of claim 44, wherein said processor periodically interrogates said input circuit to determine whether said first valve mode data or said second valve mode data has changed.

46. A control system that controls the operation of a first valve and of a second valve, said first valve controlling the flow of a liquid or a gas to a first dispensing device, and said second valve controlling the flow of a liquid or a gas to a second dispensing device, said control system comprising:
  an input circuit that accepts first valve mode data and first valve time data for said first valve, and that accepts second valve mode data and second valve time data for said second valve, said first and second valve mode data determining which mode of a plurality of possible modes in which their respective valves are to operate, said modes determining whether the respective valves respond or fail to respond to an input from said control system or from a dispensing device, and said first and second valve time data determining the length of time that the respective valve is to be operated or rendered inoperative;
  a valve controller that processes said first valve mode data and said first valve time data and that generates a first output signal to operate said first valve, and that also processes said second valve mode data and said second valve time data and that generates a second output signal to operate said second valve; and
  a change circuit, including a multiplexer, that receives changed first valve mode data, changed first valve time data, changed second valve mode data, and changed second valve time data, and that transmits said changed fist valve mode data, said changed first valve time data, said changed second valve mode data, and said changed second valve time data to said controller.

47. A control system that controls the operation of a first valve which in turn operates a first gas or liquid dispensing device, and that controls the operation of a second valve that in turn controls the operation of a second gas or liquid dispensing device, said control system comprising:
  a first slave circuit that operates said first valve, including
    a first input circuit that accepts first valve mode data and first valve time data for said first valve, said first valve mode data determining which mode of a plurality of possible modes in which said first valve is to operate, said modes determining whether a valve responds or fails to respond to an input from said control system or from a dispensing device, and said first valve time data determining the length of time that the first valve is to be operated or rendered inoperative;
    a first controller that processes said first valve mode data and said first valve time data, and that generates a first output signal to operate said first valve;
    a first change circuit that receives changed first valve mode data and changed first valve time data, and that transmits said changed first mode data and said changed first time data to said first controller;
  a second slave circuit that operates said second valve, including
    a second input circuit that accepts second valve mode data and second valve time data for said second valve, said second valve mode data determining which mode of a plurality of possible modes in which said second valve is to operate, and said second valve time data determining the length of time that the second valve is to be operated or rendered inoperative;
    a second controller that processes said second valve mode data and said second valve time data, and that generates a second output signal to operate said second valve;
    a second change circuit that receives changed second valve mode data and changed second valve time data, and that transmits said changed second mode data and said changed second valve time data to said second controller;
  a master control circuit that is electrically connected to said first slave circuit and to said second slave circuit, including
    a third input circuit that accepts changed first valve mode data and changed second valve mode data;
    a third controller that processes and transmits said changed first valve mode data to said first slave circuit, and that processes and transmits said changed second valve mode data to said second slave circuit; and
  means for interrogating said first slave circuit and said second slave circuit to determine whether said first and second valve mode data respectively or said first and second valve time data respectively has changed.

* * * * *

UNITED STATES PATENT AND TRADEMARK OFFICE
CERTIFICATE OF CORRECTION

PATENT NO. : 5,331,619
DATED : July 19, 1994
INVENTOR(S) : Barnum et al

It is certified that error appears in the above-indentified patent and that said Letters Patent is hereby corrected as shown below:

On title page, item [56] U.S. Documents, 4,569,020, delete "2/1986" and substitute therefor ---2/1985---; CLAIM 19, Col. 21, Line 4, delete "fist" and substitute therefor ---first---; CLAIM 43, Col. 24, Line 42, delete "changes" and substitute therefor ---changed---; CLAIM 46, Col. 25, Line 61, delete "fist" and substitute therefor ---first---

Signed and Sealed this

Twenty-seventh Day of September, 1994

Attest:

BRUCE LEHMAN

Attesting Officer    Commissioner of Patents and Trademarks